FUNCTIONAL DIAGRAM FOR "PEDESTRIAN CALL" ON PHASE C

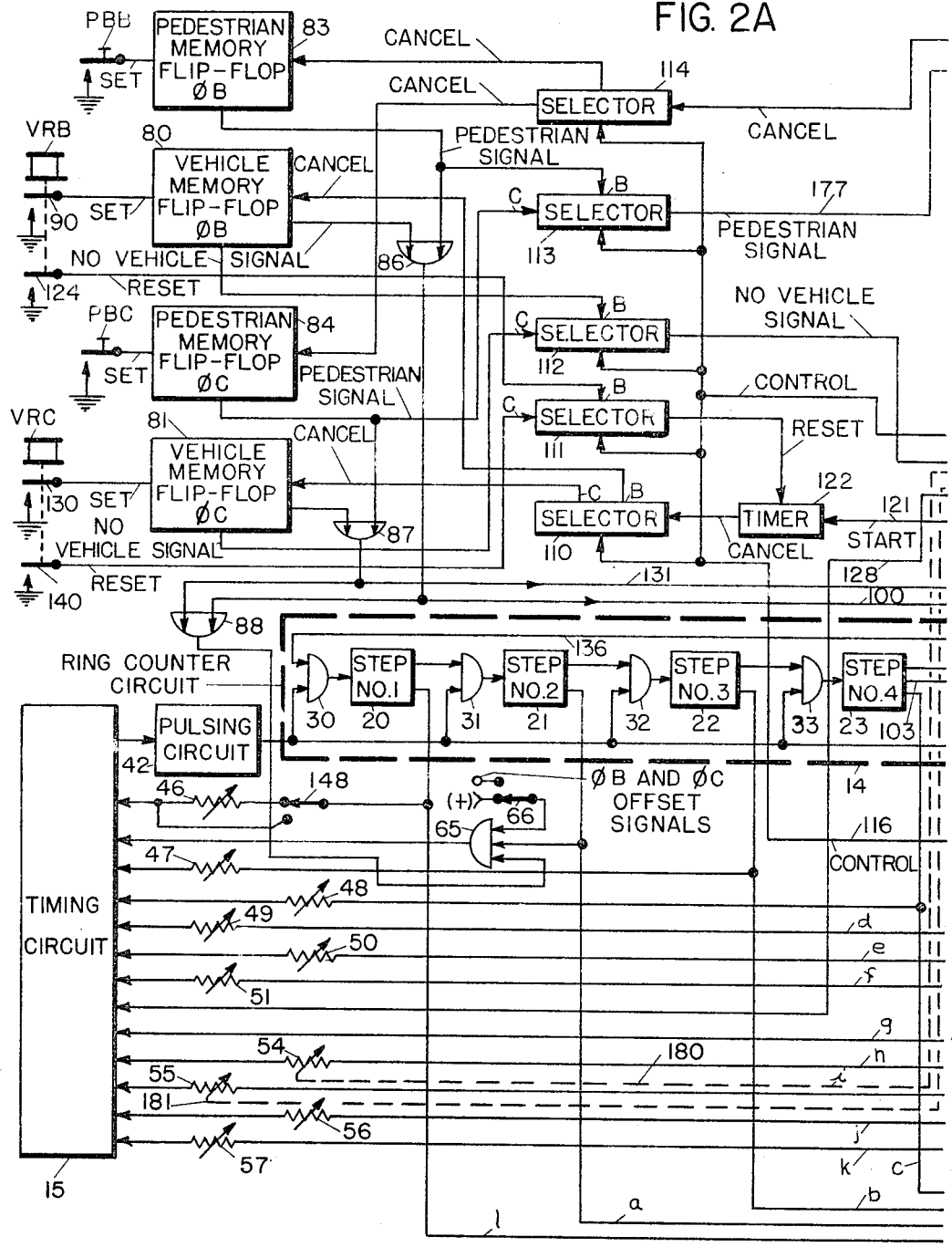

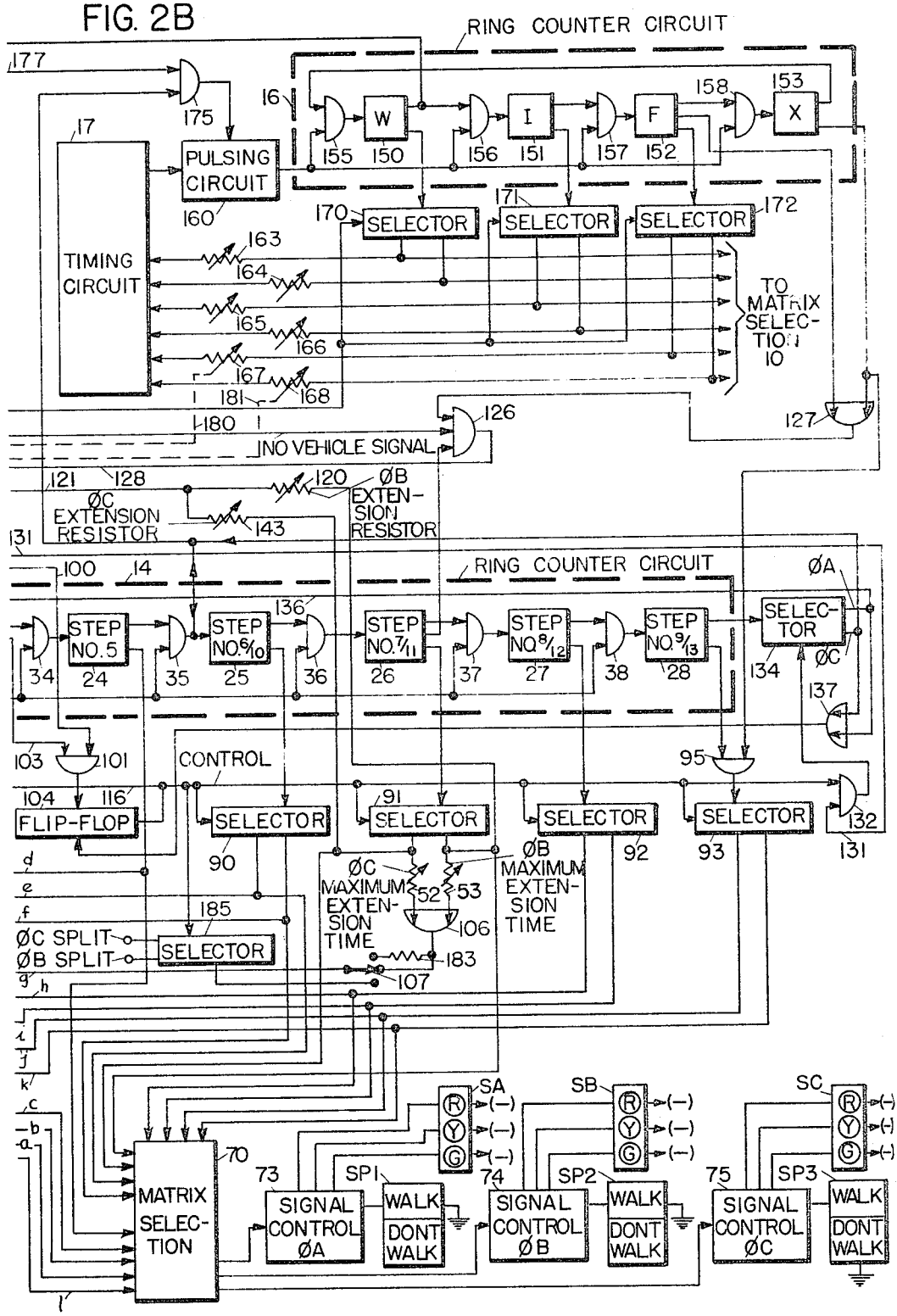

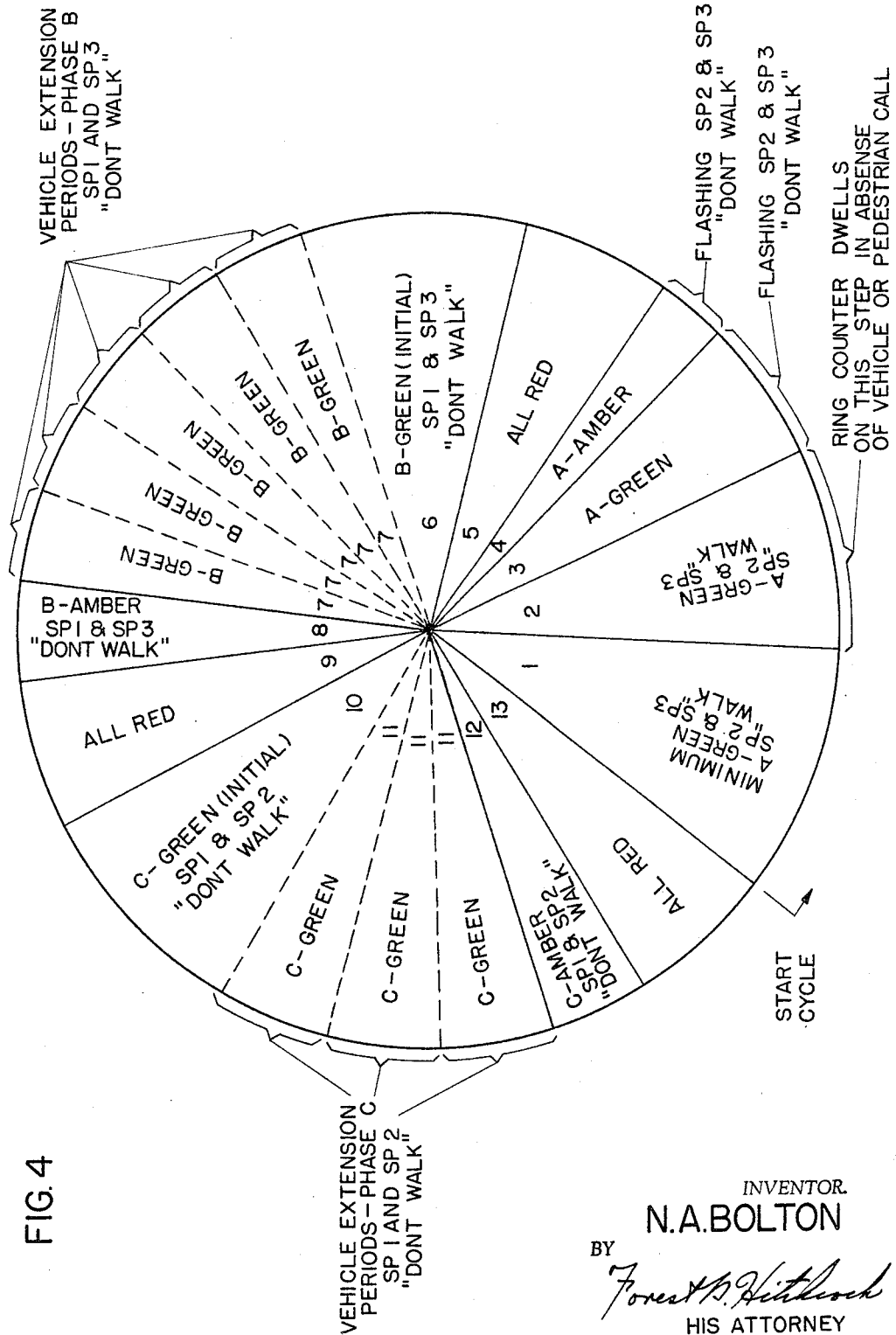

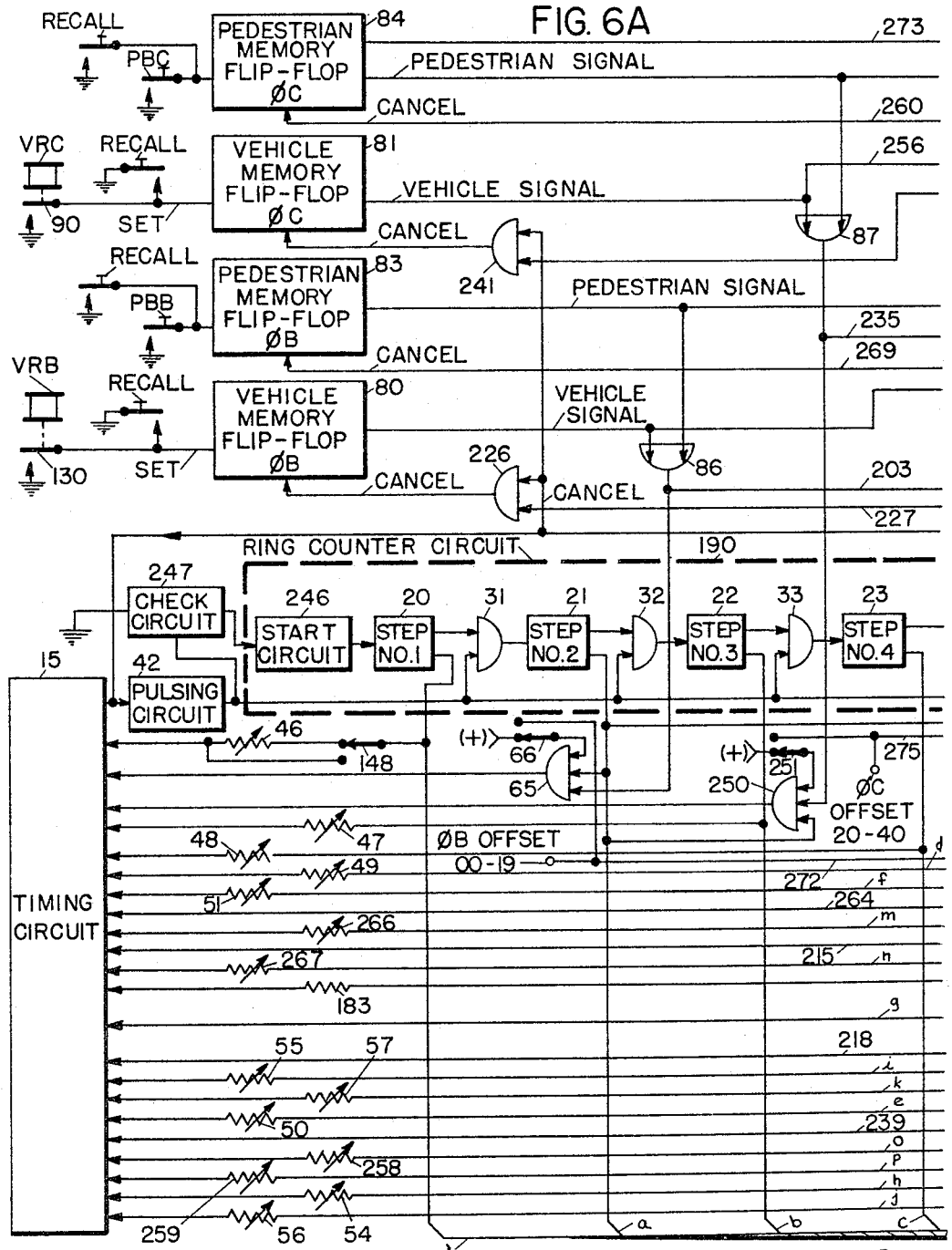

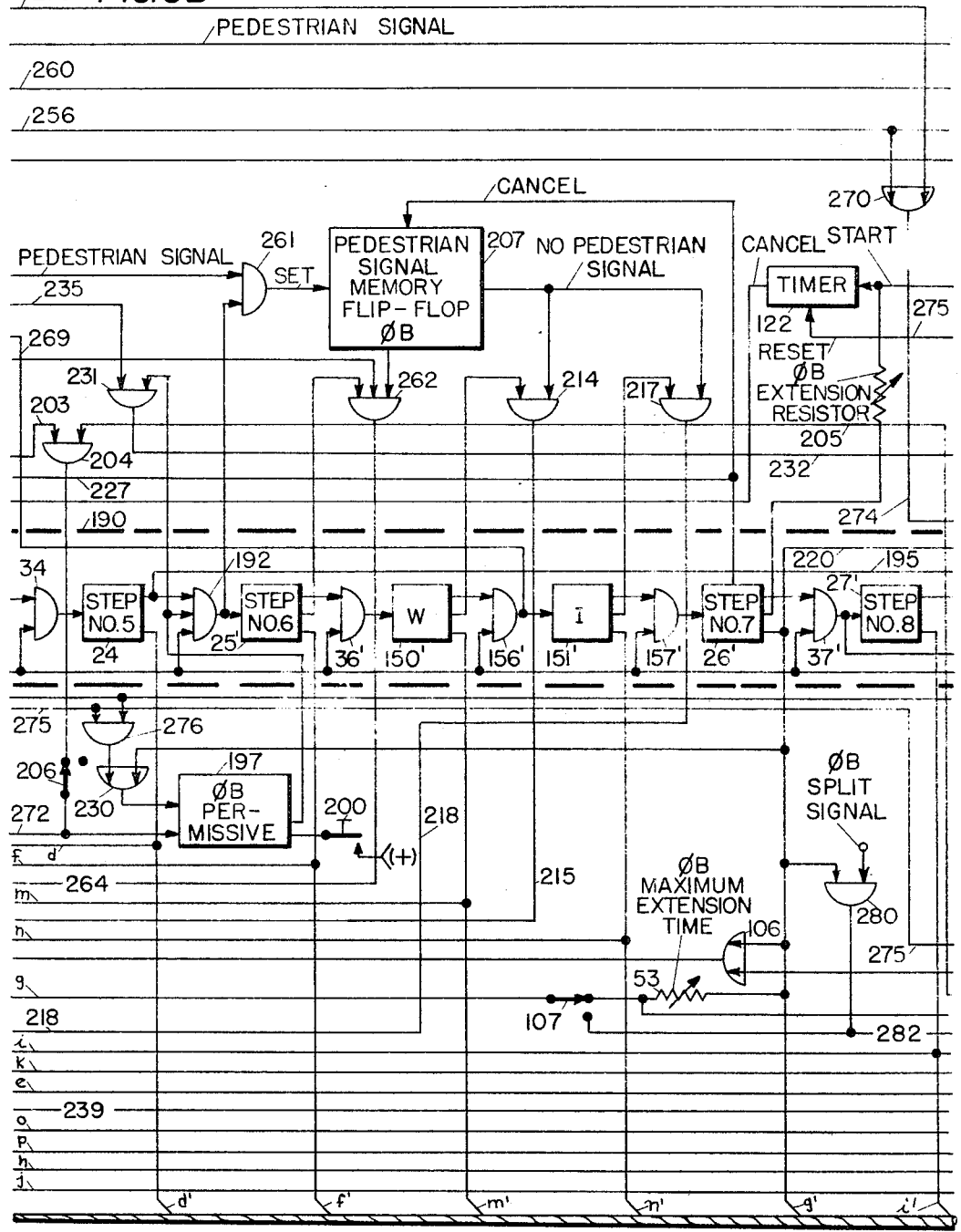

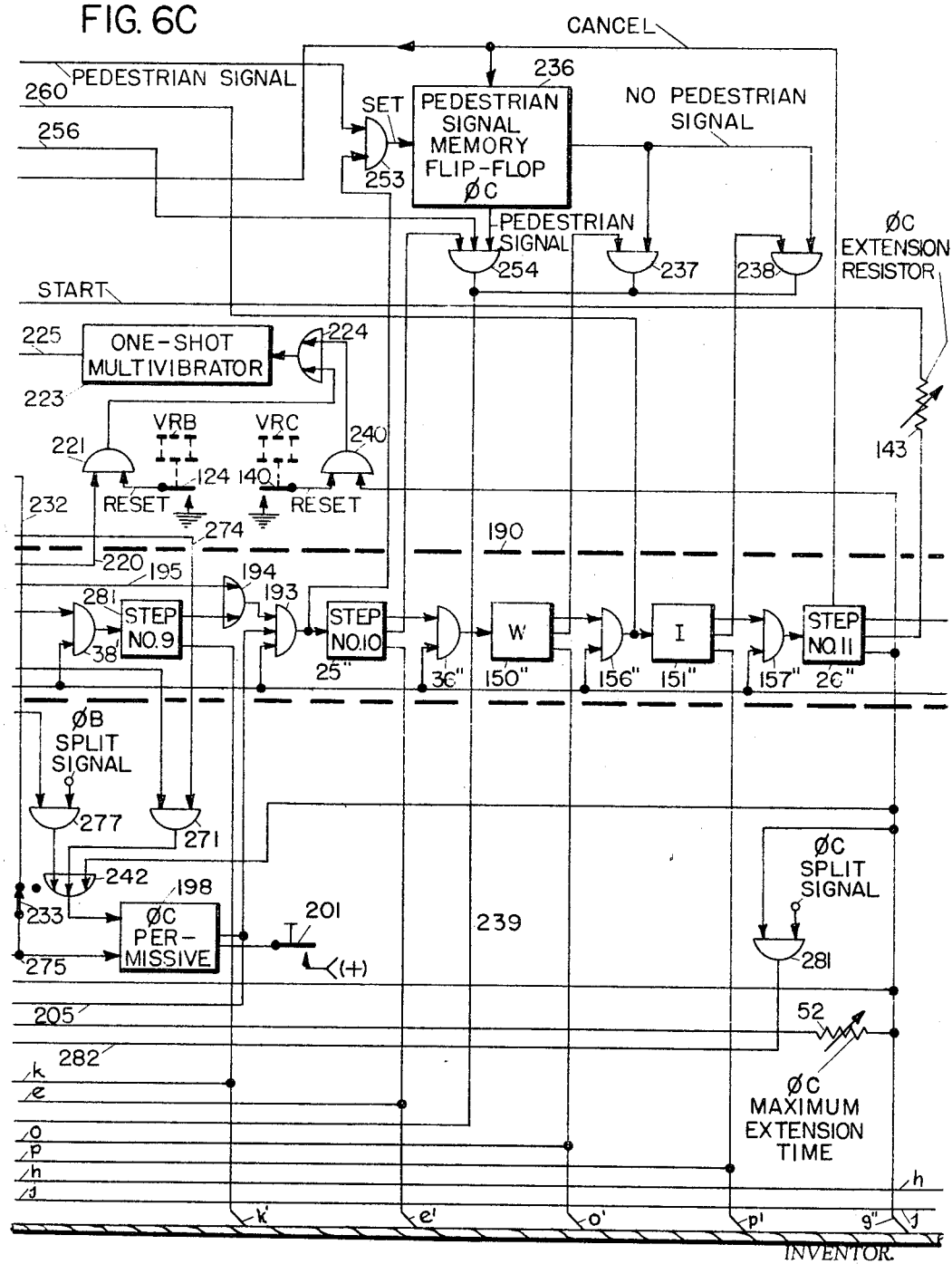

Sept. 20, 1966     N. A. BOLTON     3,274,547
TRAFFIC SIGNAL CONTROLLER
Filed Oct. 29, 1963     13 Sheets-Sheet 9
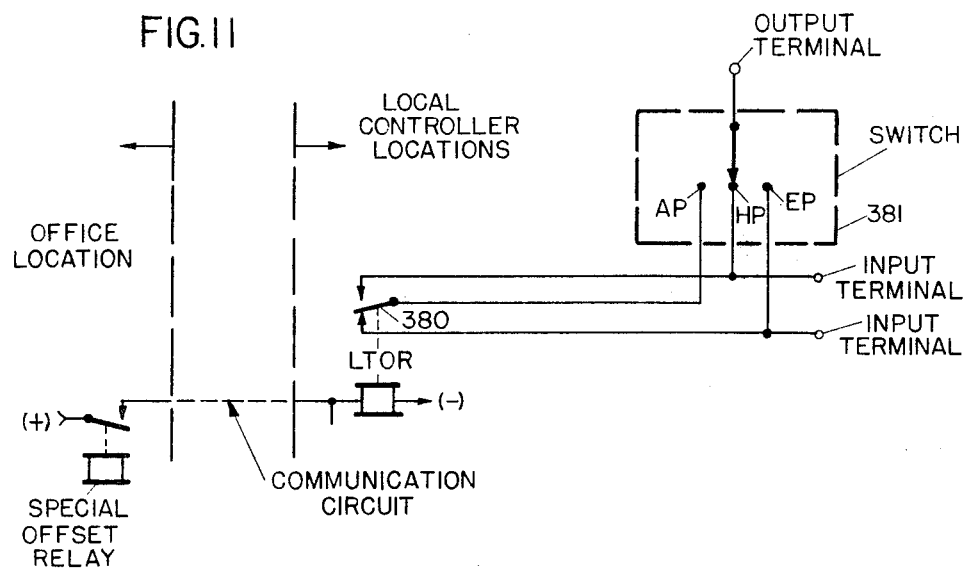
FIG. 11
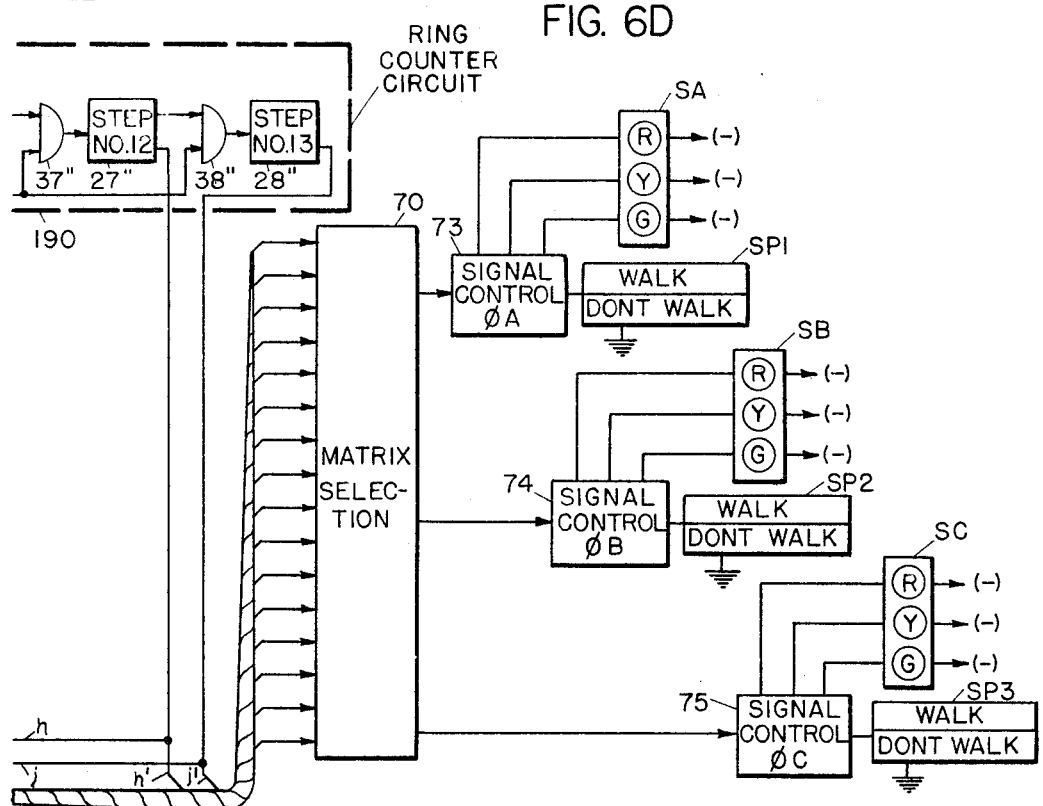
FIG. 6D
FIG. 7
| FIG. 6A | FIG. 6B | FIG. 6C | FIG. 6D |
INVENTOR.
N. A. BOLTON
BY 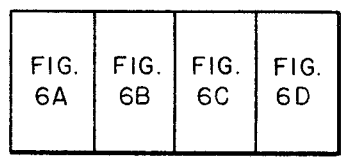
HIS ATTORNEY

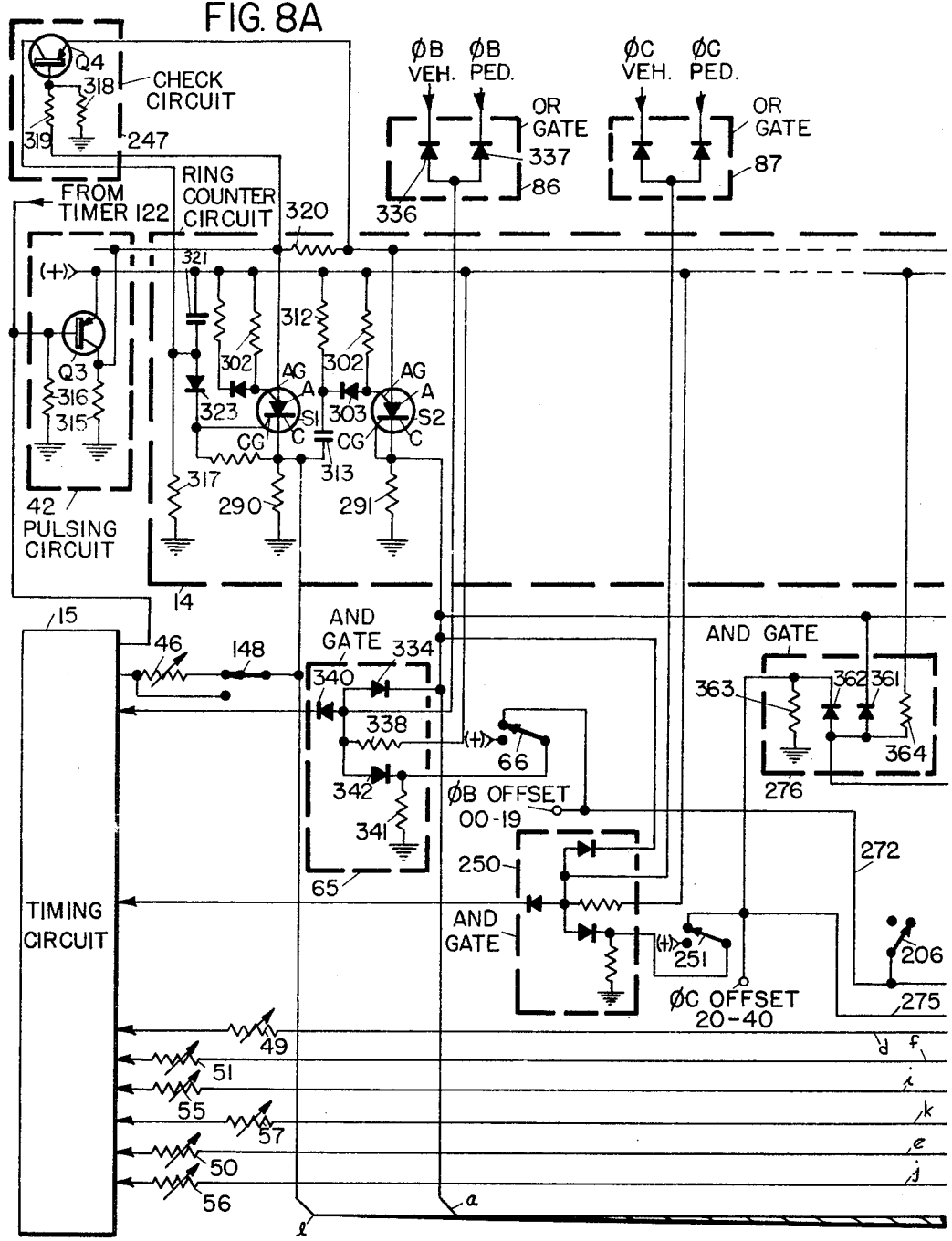

Sept. 20, 1966    N. A. BOLTON    3,274,547
TRAFFIC SIGNAL CONTROLLER
Filed Oct. 29, 1963    13 Sheets-Sheet 11

INVENTOR.
N.A. BOLTON
BY
*Forest B. Hitchcock*
HIS ATTORNEY

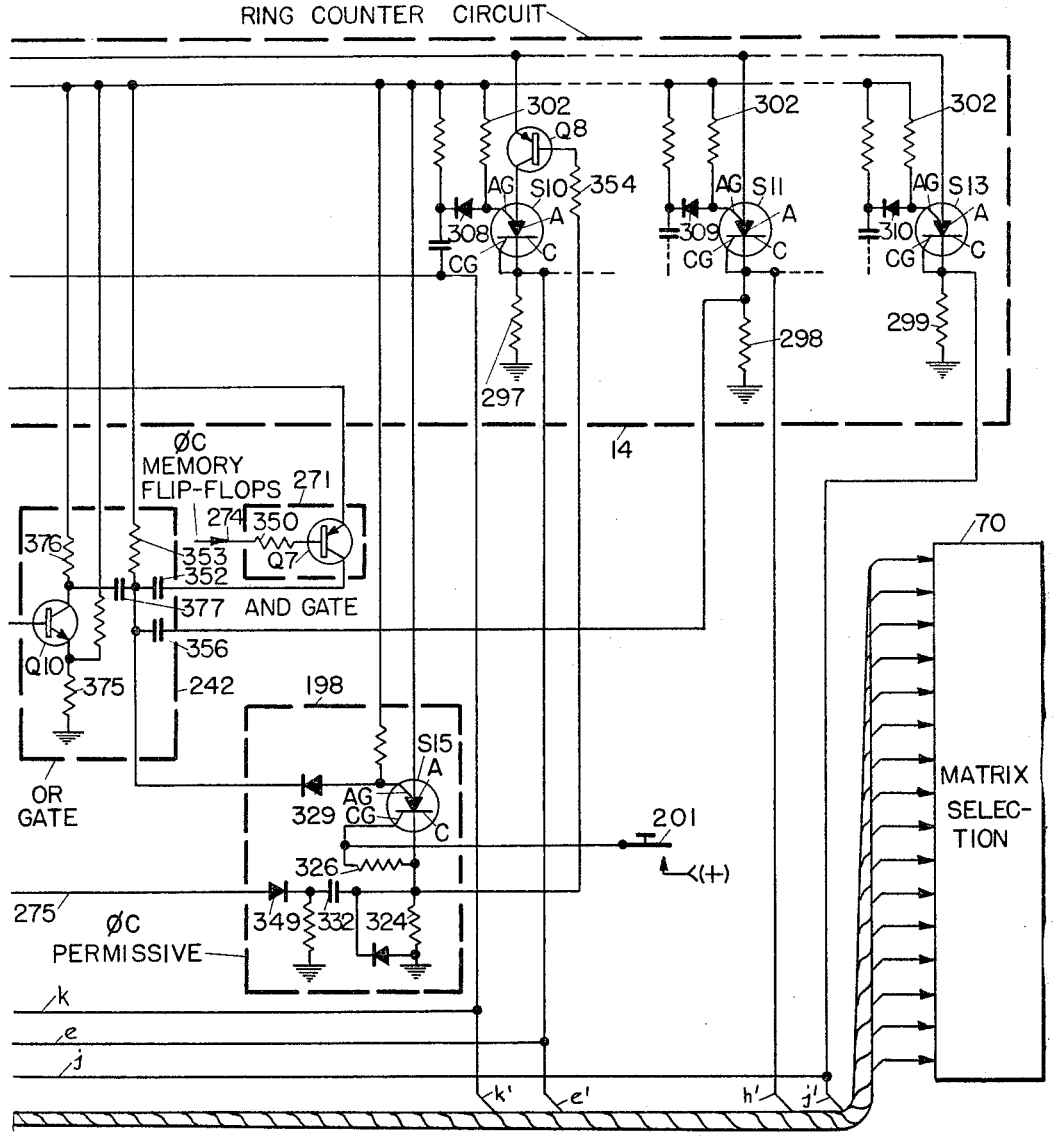

Sept. 20, 1966            N. A. BOLTON            3,274,547

TRAFFIC SIGNAL CONTROLLER

Filed Oct. 29, 1963            13 Sheets-Sheet 13

FUNCTION DIAGRAM FOR "PEDESTRIAN CALL" WITH "VEHICLE CALLS" ON PHASE C

INVENTOR.
N.A. BOLTON
BY
HIS ATTORNEY

United States Patent Office 3,274,547
Patented Sept. 20, 1966

3,274,547
TRAFFIC SIGNAL CONTROLLER
Norman A. Bolton, Scottsville, N.Y., assignor to The General Signal Corporation, Rochester, N.Y., a corporation of New York
Filed Oct. 29, 1963, Ser. No. 319,761
9 Claims. (Cl. 340—37)

This invention relates to a highway traffic signal controller, and, more particularly, pertains to an electronic controller of the semi-actuated type in which the operating characteristics for each phase can be readily varied electronically and selected successively for operation according to a vehicle or pedestrian call for each actuated phase.

At an intersection of a main street or artery with a plurality of cross streets, it is frequently desired to maintain the green aspect for the main street or artery continuously energized to permit continuous traffic flow thereon until one or more vehicles is detected on one or more of the cross street approaches or pedestrians wish to cross the main street at the intersection. Vehicle detection apparatus is normally employed on each of the cross street approaches to the intersection for detecting the presence of a vehicle on the separate approaches and causing a green aspect for traffic flow on the respective cross street to be provided. In addition, a manual control is provided which when actuated by a pedestrian causes a walk period for pedestrian movement across the main street or artery to be provided.

It is common practice to employ a cam shaft having a plurality of cam shaft positions in each of which different circuits are completed for controlling the traffic signal to display a distinctive combination of signal aspects. The cam shaft when driven by suitable means is successively stepped cyclically through its different cam shaft positions. Normally, the cam shaft is maintained in a given one of its positions wherein the traffic signal is controlled to display a green aspect for main street traffic movement and is operated from such given position only in response to a vehicle call or pedestrian call on one or more of the cross streets. For an intersection having a non-actuated phase and at least two actuated phases, a separate group of cam shaft positions is normally provided for each of the different phases which requires operation of the cam shaft through all of its positions when a vehicle call or pedestrian call occurs for the actuated phase to which the last group of cam shaft positions is allotted. In another instance, a first group of cam shaft position is allotted to the non-actuated phase and a single second group is allotted to each of the actuated phases as selected in response to a vehicle call or pedestrian call for the respective actuated phases, but it is a requirement that each position of the first group of cam shaft positions be operated through for successive vehicle calls or pedestrian calls in the same phase or a different actuated phase. In either instance, the requirement of operating the cam shaft through unwanted positions prior to operating through desired positions for a vehicle call or pedestrian call unduly limits the volume of traffic movement through the intersection.

It is contemplated by the present invention to provide an all-electronic traffic signal controller in the form of two embodiments having its normal operating characteristics subject to modification by vehicle calls or pedestrian calls for each of several actuated phases for permitting a maximum volume of traffic movement through the intersection. More specifically, it is proposed herein to control the traffic signal to display a green aspect continuously for the non-actuated phase in the absence of both vehicle calls and pedestrian calls on all of the actuated phases. In response to a vehicle call or pedestrian call on one or more of the actuated phases, however, the traffic signal controller of the present invention initiates a new signal cycle wherein the traffic signals and pedestrian signals are controlled in accordance with the vehicle call or pedestrian call. Each new signal cycle may be comprised of a different number of successive portions during each of which a different combination of traffic signals and/or pedestrian signals are controlled according to the occurrence of one or more calls on one or more actuated phases.

In the two proposed embodiments of the present invention, the portions of the signal cycle during which the traffic signal is controlled to display different combinations of signal aspects are measured by an electronic timing means which includes an electronic step-by-step means capable of cyclic operation through all of its different steps or only a portion of its different steps. In the absence of any vehicle call or pedestrian call, the electronic step-by-step means dwells on a given step thereof and therein controls the traffic signal and pedestrian signals to provide a green aspect for the non-actuated phase and a red or stop aspect for all actuated phases, while additionally providing a WALK indication for pedestrian movement across each of the actuated phases and a DONT WALK indication for prohibiting pedestrian movement across the non-actuated phase. However, a vehicle call and/or pedestrian call on one or more of the actuated phases causes the electronic step-by-step means to operate successively only through particular ones of its different steps allotted to that actuated phase wherein the traffic signals and pedestrian signals are accordingly controlled. On each of the successive steps on which the electronic step-by-step means operates, a separate electronic timing circuit measures the time period for that step during which the traffic signals and pedestrian signals are controlled to display a combination of indications allotted to that step of the electronic step-by-step means.

Each of the two proposed embodiments herein includes storage means for storing each vehicle call or pedestrian call for each actuated phase and selection means responsive to the conditions of the several storage means to operate the electronic step-by-step means in only those steps thereof to which are assigned the different combinations of traffic signal aspects and pedestrian signal indications which are to be displayed in response to stored vehicle calls and/or pedestrian calls. In each of the two proposed embodiments herein, the electronic step-by-step means electronically skips unwanted steps in order to operate through the desired steps with a minimum of time lapse being involved in the electronic skipping of the unwanted steps.

In one embodiment herein, it is proposed to provide an auxiliary electronic step-by-step means capable of cycle operation through its different steps for controlling the pedestrian signals in each step thereof to display a different combination of WALK—DONT WALK pedestrian signals for the non-actuated phase and the several actuated phases. In the absence of a pedestrian call from any of the actuated phases, the auxiliary electronic step-by-step means dwells on a particular step thereof and therein controls the pedestrian signals to provide a WALK indication for each actuated phase and a DONT WALK indication for the non-actuated phase. However, in response to a pedestrian call for one or more of the actuated phases, both the electronic step-by-step means and the auxiliary electronic step-by-step means are operated successively through their respective different steps for controlling the traffic signal and pedestrian signal to display desired aspects and indications according to the responsive condition of the selection means. Each step of the auxiliary electronic step-by-step means defines a portion of a pedestrian call signal cycle during which a combination of WALK—DONT WALK pedestrian signals are operated according to the stored pedestrian calls for one of the actuated phases and the responsive condition of the selection means. A separate electronic timing circuit for each actuated phase is provided for each of several steps of the auxiliary electronic step-by-step means except its dwell step which when selected by the selection means for a stored pedestrian call for the corresponding actuated phase measures the time period that the auxiliary step-by-step means remains on that step. During the time period that the auxiliary step-by-step means operates through its several steps according to the selected separate timing circuits the electronic step-by-step means operates through a particular number of its different steps in a time period measured by the selected separate timing circuits of the auxiliary step-by-step means.

In the second embodiment proposed herein, the electronic step-by-step means includes additional steps with each group of steps allotted to an actuated phase through which the electronic step-by-step means operates only when a pedestrian call is stored for that actuated phase but not a vehicle call. In response to a vehicle call and in the absence of a pedestrian call for an actuated phase, the electronic step-by-step means operates through a group of steps corresponding to the actuated phase, but electronically skips the additional steps provided for controlling the pedestrian signals for that actuated phase. In response to only a pedestrian call for an actuated phase, the electronic step-by-step means operates through selected ones of the group of different steps and the additional steps for that actuated phase for appropriately controlling the traffic signals and pedestrian signals to display the required signal indications for the non-actuated phase and each of the actuated phases.

In each of the two embodiments herein, it is contemplated that the controller when operated from its at rest, or dwell, condition be effective to provide control of the traffic signals responsive to a first vehicle call for an actuated phase, to provide an initial green aspect display for the corresponding cross street, and continued green aspect display for that cross street where each additional vehicle on that cross street is detected within a vehicle extension time period electronically measured while the electronic step-by-step means is operating in a particular step and from the time that the preceding vehicle was detected. While the electronic step-by-step means is operating in each such particular step thereof, a maximum time period is measured for the actuated phase having successive vehicle calls so as to limit the time that the electronic step-by-step means operates on that step irrespective of additional vehicle detections on that actuated phase.

It is further contemplated that the traffic signal controller disclosed in each of the two embodiments herein include suitable switching means, either manually or automatically operated, for appropriately connecting the controller in a coordinated system with controllers at other adjacent intersections and to a remote control station over a suitable communication channel. By appropriate coupling of received offset and split signals to the controller embodiments of the present invention and according to vehicle calls and/or pedestrian calls on the actuated phases at an intersection, a coordinated system including a plurality of intersections, each of the semi-actuated type, can be achieved. One system of control, for example, for transmitting offset and split signals to the respective intersections and automatically applying them to the controller thereat may be of the type shown and described in the pending application Ser. No. 239,714, filed November 23, 1962 by J. H. Auer, Jr. et al.

Thus, one object of this invention is to provide a traffic signal controller including an electronic step-by-step means having a group of different steps for each actuated phase through which such means is operable successively in response to a vehicle call for that actuated phase and in which the steps corresponding to the actuated phases not having a stored vehicle call are electronically skipped.

Another object of this invention is to provide a traffic signal controller including an electronic step-by-step means having a group of steps through which such means is successively operated and selectively employed with each of several actuated phases having stored vehicle calls for controlling the traffic signal to display corresponding combinations of traffic signal aspects.

Another object of this invention is to provide a traffic signal controller including an electronic step-by-step means operable cyclically through its different steps in response to stored vehicle calls or a stored pedestrian call for controlling the traffic signal, and an auxiliary electronic step-by-step means operable cyclically through its different steps in response to a stored pedestrian call when the electronic step-by-step means has operated to a particular step thereof for each of several actuated phases.

Another object of this invention is to provide a traffic signal controller including an electronic step-by-step means operable from a dwell step successively through the steps of successive groups of steps, each step of a group assigned to an actuated phase being operated only when the corresponding actuated phase has a stored vehicle call and stored pedestrian call.

Another object of this invention is to provide an all-electronic semi-actuated traffic signal controller for at least one non-actuated phase and several actuated phases which is operated from a normal dwell condition to a different condition in response to a vehicle call or pedestrian call for any one or more of the several actuated phases for suitably controlling the traffic signals and pedestrian signals without the use of moving parts.

Other objects, purposes and characteristic features of this invention will be part obvious from the accompanying drawings and will in part be pointed out as the description of the invention progresses.

In the description of the invention which follows, reference will be made to the accompanying drawings in which:

FIG. 1 is a diagrammatic illustration of a typical intersection of two cross streets with a main street or artery and having suitably positioned traffic signals and pedestrian signals which may be controlled by the traffic signal controller of this invention in response to vehicle calls and/or pedestrian calls;

FIGS. 2A and 2B when placed with FIG. 2B to the right of FIG. 2A illustrate diagrammatically and in block diagram form one embodiment of this invention;

FIG. 4 is a polar diagram illustrating a typical sequence of operation of the traffic and pedestrian signals of FIG. 1 for a plurality of vehicle extension time periods in each of phase B and phase C;

Figure 1:
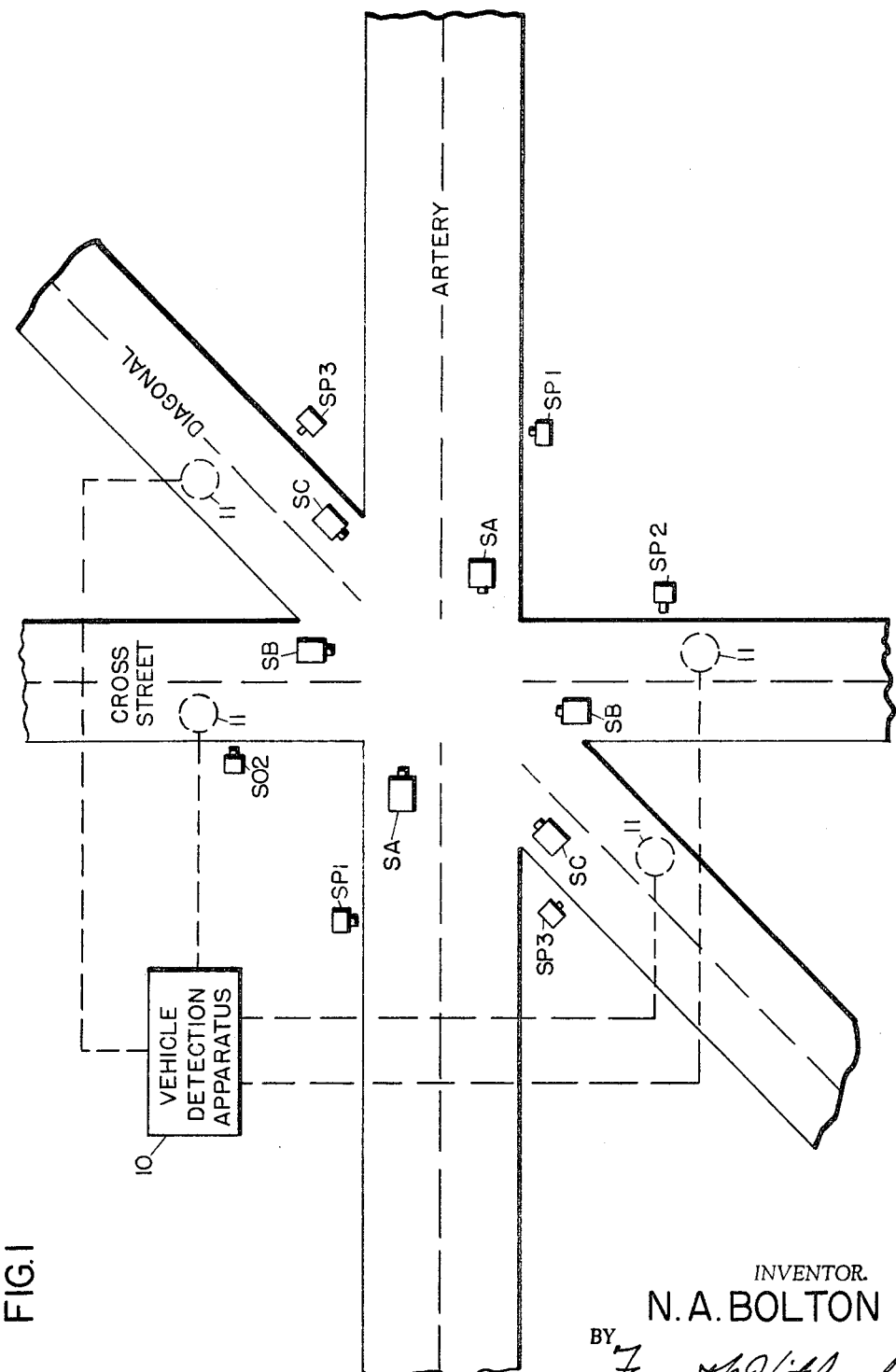
Figure 8B:
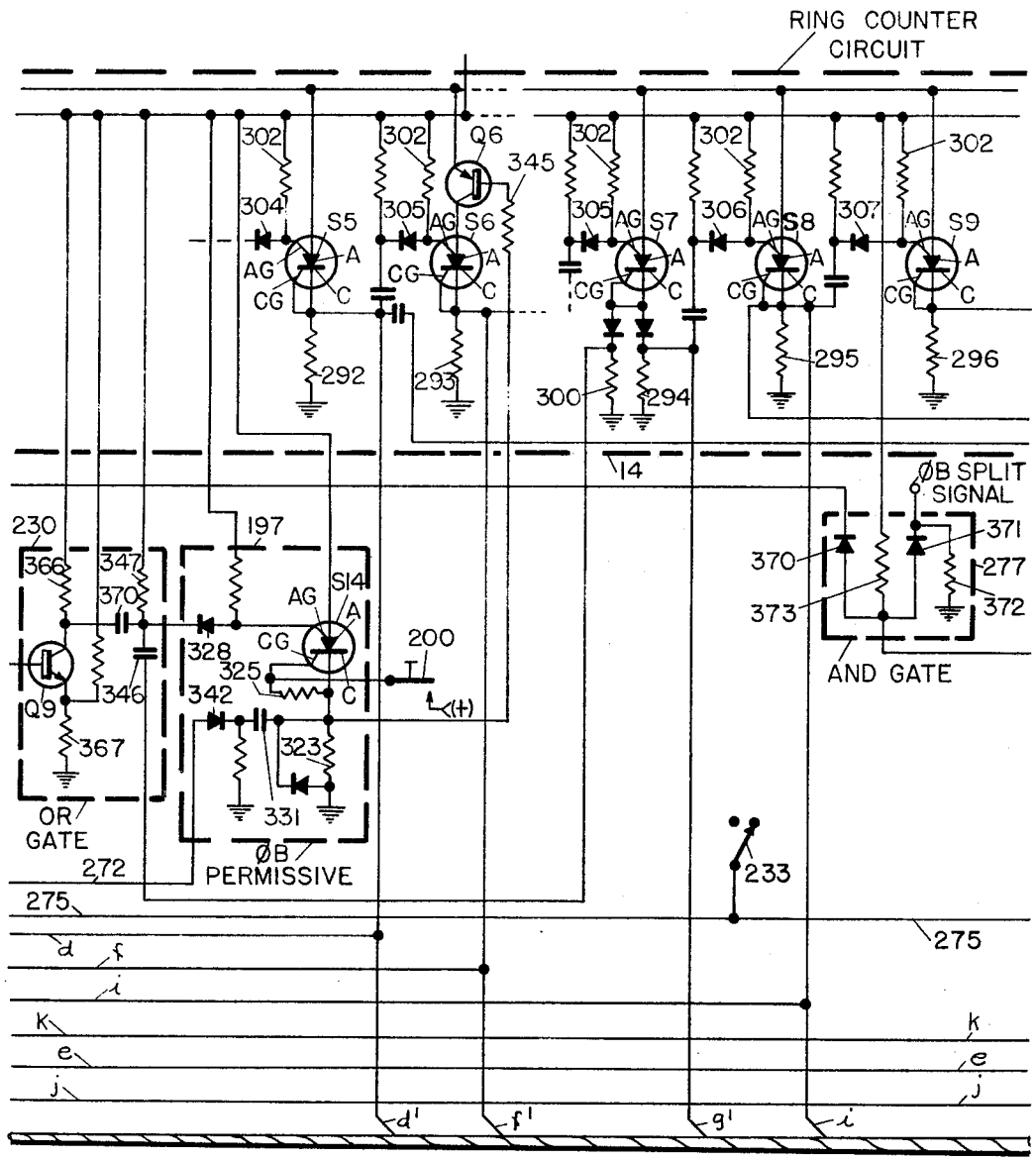
Figure 10:
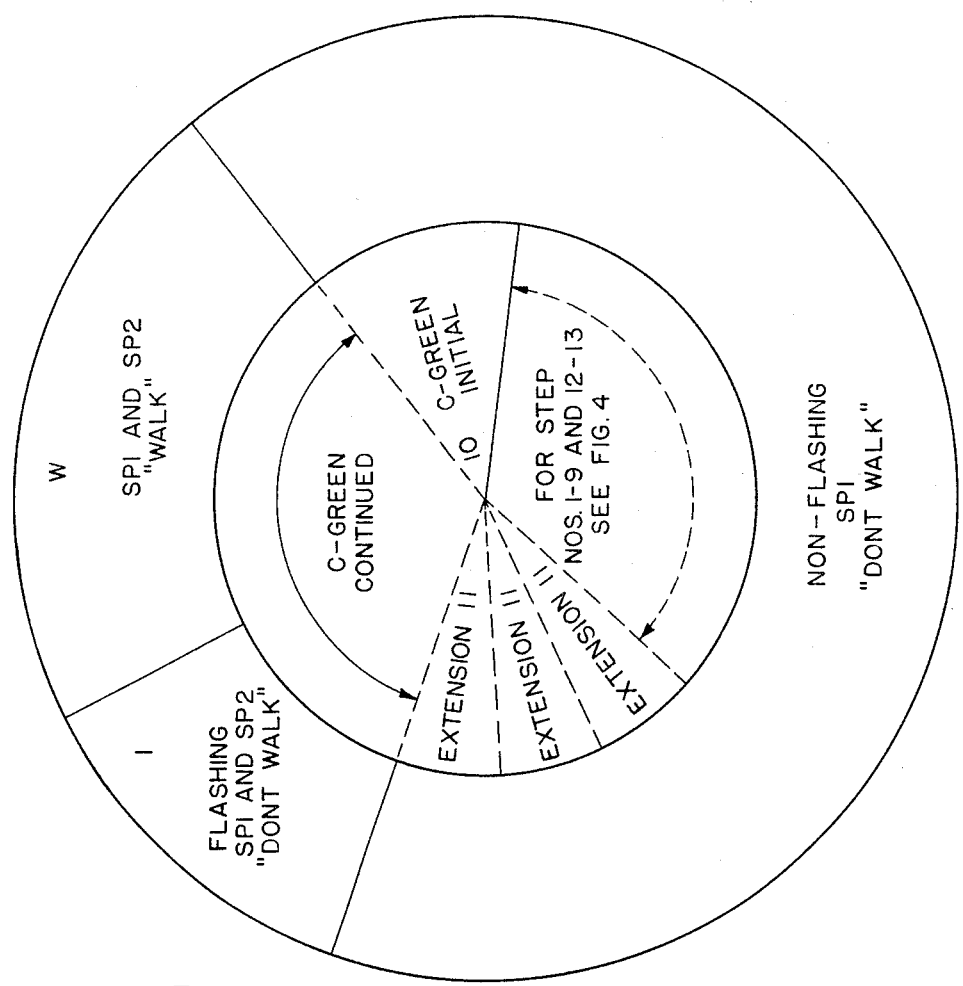

FIGS. 6A, 6B, 6C and 6D when arranged as shown in FIG. 7 illustrate diagrammatically and in block diagram form a second embodiment of this invention;

FIG. 7 illustrates the layout of the individual sheets comprising the drawing of FIG. 6;

FIGS. 8A, 8B and 8C when arranged as shown in FIG. 9 illustrates by partial schematic diagram a portion of the block diagram of FIG. 6;

FIG. 9 illustrates the layout of the individual sheets comprising the drawing of FIG. 8;

FIG. 10 is a partial polar diagram illustrating one typical sequence of operation of the traffic and pedestrian signals of FIG. 1 for phase C when employing the embodiment of FIG. 6; and FIG. 11 illustrates one form of a switching arrangement for coupling the controller embodiments of FIGS. 2 and 6 to a centralized coordinating system.

GENERAL DESCRIPTION—FIG. 1

Referring now to FIG. 1, a typical intersection having a main street, a cross street and a diagonal street is shown with related traffic and pedestrian signals being diagrammatically illustrated. For purposes of discussion herein, the main street may be referred to as phase A having the traffic signals designated SA, the cross street may be referred to as phase B having the traffic signals designated SB and the diagonal street may be referred to as phase C having the traffic signals SC, such signals SA, SB and SC being positioned relative to the intersection in the manner illustrated. Pedestrian signals SP1, SP2 and SP3 associated respectively with phase A, phase B and phase C are generally positioned as diagrammatically illustrated. Vehicle detection apparatus 10 includes vehicle detectors positioned relative to the cross street and diagonal street so as to detect vehicles appearing in the respective detection zones designated 11.

As suggested in FIG. 1, it is contemplated that the typical intersection diagrammatically illustrated be of the type employing semi-actuated control. By "semi-actuated control" is meant a system wherein a vehicle detector is employed on the cross street and diagonal street approaches to the intersection so that the cross street and diagonal street herein each comprises an "actuated" phase, while the main street comprises a "non-actuated" phase. In each such actuated phase, the length of time that a green aspect is displayed to traffic traveling in each of such directions is a function of the number of vehicles detected, varying from some minimum value when there is but one vehicle waiting for a green aspect up to a maximum value when a substantially unbroken stream of traffic seeks to enter the intersection from either the cross street approach or diagonal street approach. Alternatively, the "semi-actuated control" may be provided for either actuated phase in response to a pedestrian-initiated control or pedestrian call, for example, to control the pedestrian signal corresponding to the actuated phase to display a WALK indication for permitting pedestrian movement across the main street or artery and the actuated phase not having a stored pedestrian call and a DONT WALK pedestrian signal for the actuated phase.

Figure 5:
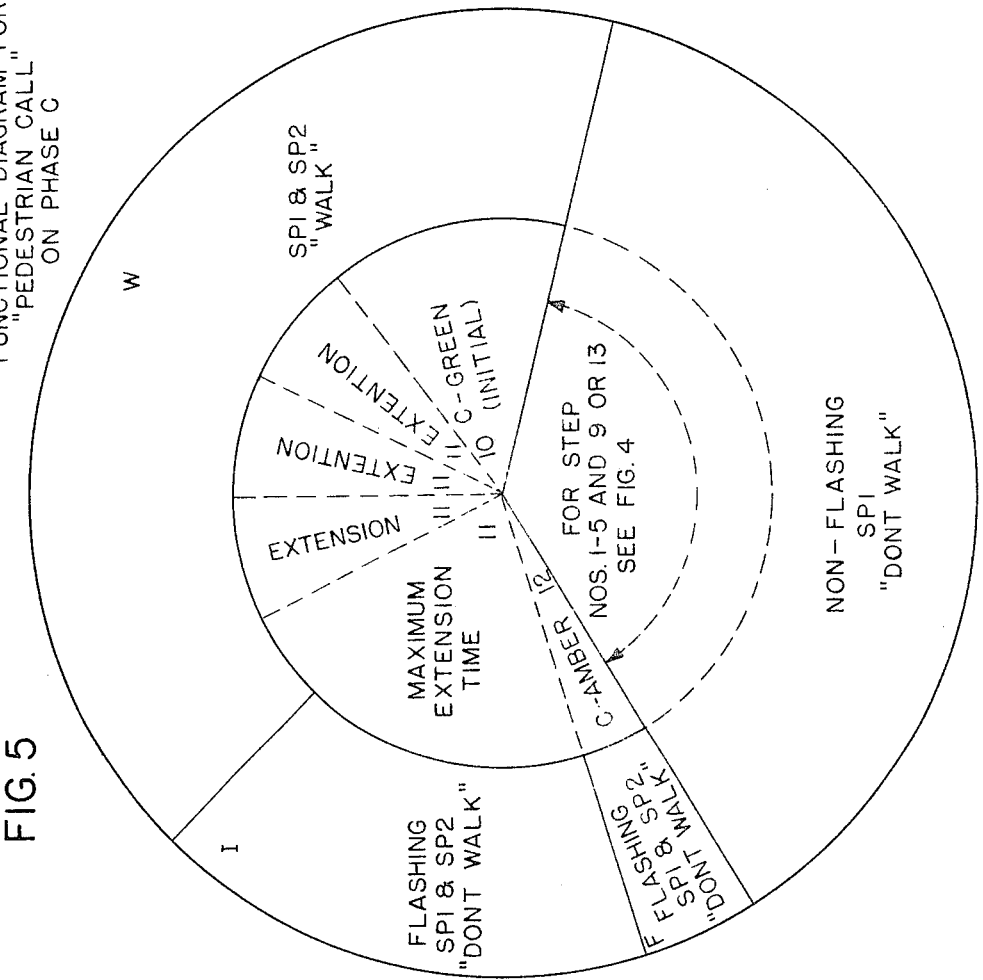
FIG. 5 is a partial polar diagram illustrating one typical sequence of operation of the traffic and pedestrian signals of FIG. 1 for phase C when employing the embodiment of FIG. 2.

Traffic signals SA, SB and SC illustrated in FIG. 1 may operate in a sequence as typically illustrated by the polar diagram of FIG. 4 where a plurality of vehicle calls occur on each of the actuated phases B and C. The polar diagram of FIG. 5 illustrates a typical sequence of operation for pedestrian signals SP1, SP2 and SP3 illustrated in FIG. 1 particularly for a pedestrian call on phase C or the diagonal street. The typical sequence of operation illustrated by the polar diagram of FIG. 4 applies to each of the two embodiments of the present invention shown respectively in block diagram form in FIGS. 2 and 6, and description of each of these embodiments will be provided with reference to the polar diagram of FIG. 4. The polar diagram of FIG. 5 applies to the embodiment of FIG. 2, whereas the polar diagram of FIG. 10 applies to the embodiment of FIG. 6.

EMBODIMENT OF FIGS. 2A AND 2B

Referring now to FIGS. 2A and 2B, each of the traffic signals SA, SB and SC illustrated in FIG. 1 are shown to include conventional proceed, stop and traffic clearance signal aspects labeled respectively G, R and Y. Pedestrian signals SP1, SP2 and SP3 are illustrated with each including WALK—DONT WALK pedestrian signal displays. It is noted that only one of each of the traffic signals SA, SB and SC and the pedestrian signals SP1, SP2 and SP3 is illustrated in FIG. 2B, but it should be understood that similar traffic and pedestrian signals are controlled to provide similar indications in the manner to be described infra for the traffic and pedestrian signals illustrated.

In general, the traffic signal controller illustrated in FIGS. 2A and 2B includes a cycle demarcating means in the form of a ring counter circuit operable through a plurality of successively different conditions for demarcating in each condition a different position of the signal cycle on which a combination of the traffic signals SA, SB and SC are controlled. Ring counter circuit 14 operates in each of its conditions for a time period measured by a timing circuit means including a timing circuit 15. Ring counter circuit 14 normally dwells in one condition thereof until a vehicle is detected on one of the actuated phases B or C or a pedestrian control is initiated for either of the actuated phases B or C. In each instance, the detection or actuation is stored and employed to operate ring counter circuit 14 through its successively different conditions. For each stored pedestrian signal, an auxiliary ring counter circuit 16 is operated through its successively different conditions for controlling pedestrian signals SP1, SP2 and SP3 for suitable time periods as measured by a timing means including timing circuit 17. Ring counter circuits 14 and 16 are operated in response to the vehicle and/or pedestrian call storages and properly interrelated by a selection means including a plurality of selector circuits. Timing is provided between the various operations by appropriately located gating means.

Ring counter circuit 14 includes steps Nos. 1–9/13 designated respectively 20–28. In this respect, steps Nos. 1–5 are employed with the non-actuated phase A, while steps Nos. 6/10–9/13 are employed with each of the actuated phases B and C. In this connection, a typical sequence of operation is illustrated by the polar diagram of FIG. 4 for these steps 20–28 where at least five vehicles are assumed to be detected in a closely-spaced sequence for phase B and three vehicles are assumed to be similarly detected for phase C. In describing the embodiment of FIGS. 2A and 2B hereinafter, reference will be made to the polar diagram of FIG. 4 relative to steps 20–28 of ring counter circuit 14.

Each of these steps 20–28 is coupled to the next successive step through an AND gate, these AND gates respectively being designated 30–38. Each such AND gate 30–38 controls the transfer of operation between respective adjacent steps. Each AND gate has two inputs, one of the two inputs being supplied by the previous step such as the input supplied to AND gate 31 from step 20 and the second of the two inputs being supplied thereto from a pulsing circuit 42. Pulsing circuit 42 provides an input which is applied to each of AND gates 30–38 concurrently at a specific time as governed by the operation of timing circuit 15 upon measurement of a time period for the step in which ring counter circuit 14 is operated. Under normal operating conditions, the output from pulsing circuit 42 is such that it blocks each of the AND gates 30–38 so that ring counter circuit 14 remains in its operating step. Upon receiving an input from timing circuit 15, however, pulsing circuit 42 partially gates all of AND gates 30–38, but only the AND gate then receiving the input from the operating step is effective to cause transfer of operation to the adjacent step.

A timing means including timing circuit 15 provides an output signal when a time period is measured for the operating step of ring counter circuit 14. Such signal renders pulsing circuit 42 effective to provide the second input to AND gates 30–38. Each of the steps 20–28 except step 21 has its output connected to timing circuit 15 through at least one variable resistor. For steps 20, 22, 23, and 24, these variable resistors are respectively designated 46, 47, 48 and 49. Two variable resistors are associated with each of steps 25–28, these variable resistors being designated respectively 50 and 51 for steps 25, 52 and 53 for step 26, 54 and 55 for step 27, and 56 and 57 for step 28. The function of each such variable resistor is to set the time period required to be measured by the corresponding operations step before timing circuit 15 provides an output to advance ring counter circuit 14 to its next step wherein it operates. In this connection, each such resistor is set to have a particular value so as to establish a desired time period when it is rendered effective for the assigned step of ring counter circuit 14 depending upon the requirements of signal control.

The general combination of a ring counter circuit, individual timing circuits and a pulsing circuit as described above with reference to FIGS. 2A and 2B is shown and described in the pending application Ser. No. 283,105, filed on May 24, 1963 by N. A. Bolton et al. of which I am co-inventor. In such pending application, one embodiment of specific circuitry is also shown and described in detail for the above-mentioned circuits; thus reference is made to such pending application for a showing of one form of specific circuitry.

As suggested in the polar diagram of FIG. 4, ring counter circuit 14 dwells on step No. 2 designated 21 in the absence of a vehicle call or pedestrian call so as to control traffic signal SA to provide a green aspect display and traffic signals SB and SC to provide a red aspect display, while controlling pedestrian signal SP1 to provide a DONT WALK display and pedestrian signals SP2 and SP3 to provide a WALK display. To insure that ring counter circuit 14 does dwell on step No. 2 in the absence of a vehicle or pedestrian call but yet be operative from step No. 2 when a vehicle call or pedestrian call does occur, AND gate 65 is provided to normally block the output of step 21 from the input of timing circuit 15 until a vehicle call or pedestrian call occurs. More specifically, AND gate 65 is a three-input AND gate, each input of which must be applied concurrently in order to provide an output which is coupled to timing circuit 15. As shown in FIG. 2A, (+) energy is applied normally through a switch 66 and this (+) energy comprises one input to AND gate 65. Step 21 of ring counter circuit 14 when operating supplies a second input to AND gate 65. A vehicle call or pedestrian call when stored is effective to supply a third input to AND gate 65 irrespective of whether the vehicle call or pedestrian call is for phase B or phase C. In the absence of the third input to AND gate 65, ring counter circuit 14 dwells on its step 21.

While ring counter circuit 14 is operating on its step 21, an output is derived from that step 21 for operating the green aspect for phase A traffic movement and the red aspect for each of the phase B and phase C traffic movements. In addition, the pedestrian WALK signals are operated for cross street and diagonal street pedestrian movement, while the DONT WALK signal is operated to prohibit pedestrian movement across the artery. More specifically, the output from step 21 is supplied over wire a to a matrix selection 70 from which it is selectively connected to operated traffic signals SA, SB and SC and pedestrian signals SP1, SP2 and SP3 through signal control circuits 73, 74 and 75 for the respective phases A, B and C. Matrix selection 75 may, for example, be a diode matrix, while signal control circuits 73-75 may each include conventional relay circuits or each, for example, include silicon controlled rectifier circuits as disclosed, for example, in the pending application, Ser. No. 283,105, filed on May 24, 1963 by N. A. Bolton et al. mentioned supra.

The vehicle detection apparatus 10 illustrated in FIG. 1 includes vehicle relays VRB and VRC shown diagrammatically in FIG. 2A each of which is normally picked up, but dropped away for indicating each vehicle detection respectively for phase B and phase C traffic movements. Such vehicle detection apparatus 10 may be of any well known type such as, for example, an ultrasonic vehicle detector for detecting each vehicle coming within the respective detection areas 11 shown in FIG. 1. In connection with each such detection area 11, it is contemplated that a vehicle relay be employed to so indicate each vehicle detection.

Each of the pedestrian signals SP2 and SP3 shown in FIG. 1 includes a pedestrian call button which may be actuated by a pedestrian for causing operation of pedestrian signals SP1, SP2 and SP3, as well as the traffic signals SA, SB and SC in order that a time interval is provided for pedestrian movement across the artery. In FIG. 2A, one pedestrian call button designated PBB for phase B and one pedestrian call button designated PBC for phase C are illustrated, but it should be understood that further pedestrian call buttons may be provided as are required.

Each vehicle call or pedestrian call for phase B and phase C is stored in a memory flip-flop until appropriately used in the controller which permits the storage in respective memory flip-flops to be cancelled. The vehicle memory flip-flops for phases B and C are designated respectively 80 and 81, while the pedestrian memory flip-flops for phases B and C are respectively designated 83 and 84. Each such memory flip-flop 80-83 is operated from its normal non-storage condition responsive to a vehicle call or pedestrian call to an abnormal storage condition wherein it remains until such storage is cancelled. During the period that each such memory flip-flop is in its abnormal storage condition, it supplies the third input to AND gate 65 which causes the output from step 21 to be applied to timing circuit 15 for advancing ring counter circuit 14 to its next step 22. The manner in which a stored vehicle call or pedestrian call is effective to operate a ring counter circuit from its dwell step and through its successive steps for a two-phase semi-actuated traffic signal controller is shown and described in my pending application Ser. No. 293,030, filed on July 5, 1963. For purposes of discussion herein, however, it is contemplated that each such stored vehicle call or pedestrian call be effective when applied through respective OR gates 86, 87 and 88 to supply the third input to AND gate 65 for advancing ring counter circuit 14 to its step 22.

The detection of a first vehicle on actuated phase B as suggested by the polar diagram of FIG. 4 causes vehicle relay VRB to drop away which causes ground to be applied to vehicle memory flip-flop 80 through back contact 90 of relay VRB. The ground input is effective to set flip-flop 80 in its abnormal condition which prevents the NO VEHICLE SIGNAL from being provided, but does provide the third input to AND gate 65 through OR gates 86 and 88 so as to permit the output of step 21 to be applied to timing circuit 15. Timing circuit 15 then operates to control pulsing circuit 42 which provides a pulsing output to each of AND gates 30-38. AND gate 32 then receiving an input from step 21 provides an output for operating step 22. While ring counter circuit 14 is operating in step 22 thereof, a separate timing circuit including resistor 47 is rendered effective to measure the time period that ring counter circuit 14 operates in its step 22. During such time period, an output from step 22 is applied over wire b and to matrix selection 70 from which it is selectively applied to signal control circuits 73, 74 and 75 for controlling the traffic and pedestrian signals. More specifically, the traffic signals are controlled to display a phase A green aspect and a red aspect for each of phase B and phase C, while the pedestrian signals are controlled to display a DONT WALK indication for signals SP1 and a flashing DONT WALK indication for signals SP2 and SP3 as suggested by the polar diagram of FIG. 4 in step No. 3 thereof.

At the termination of the measured time period for step 22 for ring counter circuit 14, ring counter circuit 14 is advanced to its next step 23 wherein a time period is measured by a separate timing circuit including variable resistor 48. During such measured time period, an output from step 23 is applied over wire c and through matrix selection 70 selectively to the signal control circuit 73, 74 and 75 for controlling the vehicle signals to display a caution or amber aspect for phase A and a red aspect for each of phase B and phase C, while controlling the pedestrian signals to display a DONT WALK for signal SP1 and a flashing DONT WALK for signals SP2 and SP3 as suggested by the polar diagram of FIG. 4 in step No. 4 thereof.

At the termination of the measured time period for step 23 of ring counter circuit 14, ring counter circuit 14 is advanced to its next step 24 wherein a separate timing circuit including variable resistor 49 is rendered effective over wire d from the output of step 24 to measure the time period allotted to step 24. During such measured time period, the output of step 24 is applied to matrix selection 70 from which it is selectively applied to signal control circuits 73, 74 and 75 to control traffic signals SA, SB and SC to each display a red aspect and pedestrian signals SP1, SP2 and SP3 to display a DONT WALK indication as suggested by the polar diagram of FIG. 4 in step No. 5 thereof.

At the termination of the time period measured for step 24 of ring counter circuit 14, ring counter circuit 14 is advanced to its step 25. It has been mentioned, supra, that steps 25–28 are employed with each of phase B and phase C. Each of the steps 25–28 includes at its output a pair of variable resistors as described above, one of which is selected when the step is operating by a selector circuit according to the stored vehicle or pedestrian call for either of phase B or phase C. It is noted in FIGS. 2A and 2B that the output from each of steps 25–28 is applied through a selector circuit and through respective variable resistors to timing circuit 15, these selector circuits being designated 90, 91, 92 and 93. In addition, other selector circuits similar to these selector circuits 90–93 are shown elsewhere in FIGS. 2A and 2B, the functions of which will be described, infra. Each of such selector circuits may be similar to the typical selector circuit shown in FIG. 3.

TYPICAL SELECTOR CIRCUIT—FIGURE 3

Figure 3:
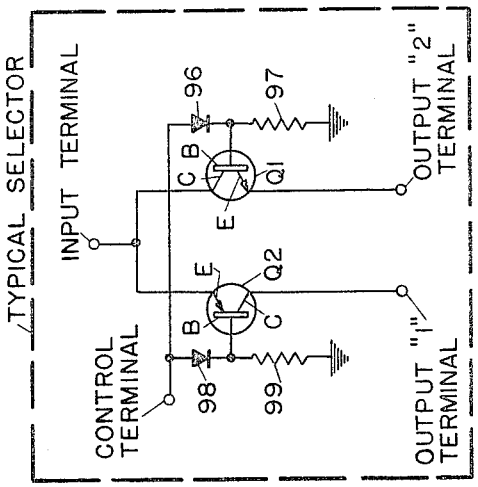
FIG. 3 is a schematic diagram of a typical selector circuit employed in the embodiment of FIGS. 2A and 2B.

Referring momentarily to FIG. 3, a typical selector circuit is diagrammatically illustrated which includes an INPUT terminal, a CONTROL terminal, an OUTPUT "1" terminal and an OUTPUT "2" terminal. The INPUT terminal is coupled to the collector C of an N-P-N type transistor Q1, while the OUTPUT "2" terminal is coupled to the emitter E of such transistor Q1. The INPUT terminal is further coupled to the emitter E of a P-N-P transistor Q2, while its collector C is coupled to OUTPUT "1" terminal. The CONTROL terminal is coupled to base B of transistor Q1 through diode 96 and to ground through a resistor 97 which together comprise a biasing circuit for transistor Q1. The CONTROL terminal is further coupled to base B of transistor Q2 through diode 98 and to ground through a resistor 99 which together comprise a biasing circuit for transistor Q2. Under normal biasing conditions, i.e., no positive input applied to the control terminal, transistor Q2 is rendered conductive in that ground is applied to its base B. In this biased condition, a signal input applied to INPUT terminal is conducted through transistor Q2 and applied effectively at the OUTPUT "1" terminal. Upon application of a positive input to the CONTROL terminal, however, transistor Q2 is cut off in that a positive (+) potential is applied to its base B, but transistor Q1 is rendered conductive in that a positive (+) potential is applied to its base B. During the conductive condition of transistor Q1, a signal input applied to the INPUT terminal is effectively applied also to the OUTPUT "2" terminal. Although it is suggested that there be only one INPUT terminal and two OUTPUT terminals, it is to be understood that two INPUT terminals could be employed with only one OUTPUT terminal.

Referring once again to FIGS. 2A and 2B, the vehicle signal stored by vehicle memory flip-flop 80 is also applied through OR gate 86 over wire 100 to AND gate 101. When ring counter circuit 14 is advanced to its step 23 as described supra, an output is taken therefrom and applied over wire 103 to AND gate 101. The concurrent application of such two inputs to AND gate 101 renders it effective to provide an output to flip-flop 104 for operating it from a normal condition to an abnormal condition.

Flip-flop 104 in its abnormal condition (characteristic of phase B operation) provides a CONTROL output which is applied to each of the selector circuits 90, 91, 92 and 93 associated respectively with steps 25–28 of ring counter circuit 14. Each of the selector circuits 90–93 conditioned by the CONTROL output couples the output of the respective steps 25–28 of ring counter circuit 14 to timing circuit 15 through variable resistors 51, 53, 55 and 57 provided for measuring phase B time periods. The CONTROL output of flip-flop 104 is additionally applied to selector circuits 110–114 over wire 116 for conditioning such selector circuits for phase B operation.

Upon measurement of the time period in step 24 of ring counter circuit 14, timing circuit 15 is rendered effective to advance ring counter circuit 14 to step 25. In step 25, an output is applied through selector circuit 90 and to timing circuit 15 over wire f and through variable resistor 51 for measuring the time period that ring counter circuit 14 remains in its step 25. During such measured time period, the output from step 25 is also applied through selector circuit 90 and matrix selection 70 to signal control circuits 73, 74 and 75 for controlling the traffic signals and pedestrian signals. More specifically, the traffic signals are controlled to display a green aspect for phase B and a red or step aspect for each of phase A and phase C, while the pedestrian signals are controlled to display a DONT WALK indication for signals SP1 and SP3 as shown by the polar diagram of FIG. 4 in step 6 thereof. It is further suggested by the polar diagram of FIG. 4 that its step 6 in an initial green period for phase B, this being the measured time period provided according to the value of variable resistor 51 responsive to a first vehicle detected on phase B.

Upon termination of the measured time period for step 25 of ring counter circuit 14, ring counter circuit 14 is advanced to its next step 26 wherein it operates to provide vehicle extension time periods for a succession of detected vehicles up to a maximum number such as, for example, ten. It is shown in the polar diagram of FIG. 4 that five such vehicle extension time periods are provided for five closely-spaced vehicles which are detected. During the measurement of the time extension periods, a separate timing circuit couples the output from step 26 through resistor 53, OR gate 106, switch 107 and over wire g to timing circuit 15 for measuring the maximum extension time period which is allotted to phase B.

To measure each vehicle extension time period, the output from step 26 is applied through selector circuit 91, through a variable resistor 120, over wire 121, to a timer 122. Resistor 120 is set to a value to measure a time period coresponding to the time required for a vehicle to pass through the intersection; this measured time period may be considered as the vehicle extension time period. Timer 122 upon measuring such a vehicle extension time period provides an output which is applied to a CANCEL input through selector 110 to memory flip-flops 80 which is effective to cancel the vehicle storage thereon.

In the present example, it is assumed that five vehicle extension time periods are provided for five closely-spaced vehicles which are detected. Upon detection of each such vehicle, relay VRB is dropped away which couples a RESET signal through its back contact 124 and through selector 111 to timer 122 which resets timer 122 to its zero timing condition wherefrom another vehicle extension time period is measured. During the measured vehicle extension time periods, an output is taken from step 26 at the top of resistor 53 and applied through matrix selection 70 to signal control circuits 73–75 for controlling the traffic signals and pedestrian signals. More specifically, the traffic signals are controlled to display a green aspect for phase B and red aspect for each of phase A and phase C, while the pedestrian signals are controlled to display a DON'T WALK indication for the signals SP1 and SP3 as suggested by the polar diagram of FIG. 4 in step 7 thereof.

Upon termination of the last vehicle extension time period for phase B, timer 122 provides its CANCEL output which is applied through selector 110 to vehicle memory flip-flop 80 to restore the flip-flop to its normal operating condition. In such normal condition, a NO VEHICLE SIGNAL is provided and applied through selector 112 to AND gate 126. AND gate 126 is a three-input AND gate, one input being the NO VEHICLE SIGNAL, a second input being supplied from step 26 of ring counter circuit 14 and the third being supplied from either step F or step X of auxiliary ring counter circuit 16. Circuit 16 normally remains in its step X so that the third input to AND gate 126 is normally supplied through OR gate 127 to AND gate 126. Ring counter circuit 14 is now assumed to be operating in its step 26 so that the second input is supplied to AND gate 126. With all three inputs being concurrently applied to AND gate 126, an output is applied over wire 128 to timing circuit 15 for advancing ring counter circuit 14 to its step 27 wherein a different combination of traffic signals and pedestrian signals are operated.

While operating in step 27 of ring counter circuit 14, its output is applied through selector circuit 92, over wire *i* and through variable resistor 55 to timing circuit 15 for measuring a time period during which the traffic signals and pedestrian signals are controlled. During such time period, the output from step 27 is also applied through matrix selection 70 to signal control circuits 73–75 for controlling the traffic signals to display an amber aspect for phase B and a red aspect for each of phase A and phase C, while controlling the pedestrian signals SP1 and SP3 to display a DON'T WALK indication as suggested by the polar diagram of FIG. 4 in step 8 thereof.

At the termination of the time period measured for step 27, ring counter circuit 14 is advanced to operate in its step 28. While operating in step 28, its output is coupled through an AND gate 95 which concurrently receives an output from step X of auxiliary ring counter circuit 16, through selector circuit 93, over wire *k* and through resistor 57 to timing circuit 15. During such measured time period, the output from step 28 is also applied through matrix selection 70 to signal control circuits 73–75 for controlling the traffic signals SA, SB and SC to display a red aspect, while controlling the pedestrian signals SP1, SP2 and SP3 to display a DON'T WALK indication as suggested by the polar diagram of FIG. 4 in step 9 thereof.

At the termination of the measured time period for step 28 of ring counter circuit 14, timing circuit 15 becomes effective to return to step 25 inasmuch as it is assumed that a vehicle has been detected for phase C and stored by vehicle memory flip-flop 81. In this connection, the detection of each vehicle causes relay VRC to drop away which couples through its back contact 130 a SET signal to flip-flop 81 to operate it from its normal operating condition to an abnormal operating condition representing vehicle storage.

A vehicle storage for phase C causes ring counter circuit 14 to operate from its step 28 to its step 25 for controlling the traffic signals to display a green aspect for phase C traffic movement. More specifically, a vehicle storage signal is applied through OR circuit 87, over wire 131, to AND gate 132. AND gate 132 also has applied to it the CONTROL output from flip-flop 104 since it is yet in its abnormal operating condition. Upon application of the phase C vehicle storage signal to AND gate 132, and also the CONTROL output from flip-flop 104, an output is obtained from AND gate 132 which is coupled to selector circuit 134 which operates it from a normal operating condition to its abnormal operating condition. In the normal operating condition of selector circuit 134 and upon termination of the measured time period for step 28 of ring counter circuit 14, the output of step 28 is applied to AND gate 30 over wire 136 to return operation of ring counter circuit 14 to step 20. However, inasmuch as there is a phase C vehicle storage which operates selector circuit 134 to its abnormal condition, the output from step 28 is applied to step 25 so that step 25 of ring counter circuit 14 is operated upon termination of the measured time period for step 28. The output from step 28 is also coupled through selector circuit 134 and OR gate 137 to flip-flop 104 for resetting flip-flop 104 to its normal operating condition wherein the CONTROL signal to selector circuits 90–93 and 110–114 is removed. Selector circuits 90–93 and 110–114 then operate to their normal operating conditions wherein included circuits corresponding to phase C are effective.

While ring counter circuit 14 is operating in its step 25, its output is coupled through selector circuit 90, over wire *e* and through variable resistor 50 to timing circuit 15 for measuring a time period during which the traffic signals and pedestrian signals are controlled. More specifically, the output from step 25 is also coupled through matrix selection 70 to signal control circuits 73–75 for controlling the traffic signals to display an initial green aspect for phase C and a red aspect for phases A and B, while controlling the pedestrian signals SP1 and SP2 to display a DONT WALK indication as suggested by the polar diagram of FIG. 4 in step 10 thereof.

Upon termination of the time period measured for step 25 and phase C, timing circuit 15 becomes effective to advance ring counter circuit 14 to its step 26. In step 26, a maximum extension time period is measured for phase C for permitting a maximum number of vehicles such as ten to enter the intersection from phase C or a lesser number according to detections of closely-spaced vehicles each of which operates relay VRC. More specifically, the output of step 26 is coupled through selector circuit 91, resistor 52, OR gate 106, switch 107 and over wire *g* to timing circuit 15 for measuring the maximum extension time period.

The output from step 26 also is taken from the top side of resistor 52 and applied through variable resistor 143 and over wire 121 to timer 122 for starting a vehicle extension time period for phase C. The variable resistor 143 is set to measure an extension time period having a duration sufficient to permit a vehicle to enter and leave the intersection from phase C. Timer 122 is normally in a zero timing condition in that the first vehicle detected by the vehicle detection apparatus 10 for operating relay VRC couples a RESET signal through back contact 140 of relay VRC and through selector circuit 111 to timer 122.

Three vehicle extension time periods are provided for phase C in step 11 as shown by the polar diagram of FIG. 4 after the initial time period in step 10 for phase C. The detection of the vehicles corresponding to the vehicle extension time periods cause flip-flop 81 to remain in its vehicle storage condition which causes ring counter circuit 14 to continue to operate in its step 26. The detection of each such vehicle operates relay VRC to reset timer 122 to a zero timing condition from which it times a new vehicle extension time period. In the absence of a vehicle detection during the third vehicle extension time period, however, timer 122 measures the entire vehicle extension time period and provides at its termination a CANCEL output which is applied through selector circuit 110 to flip-flop 81 for returning flip-flop 81 to its normal operating condition wherein a NO VEHICLE SIGNAL is provided. The NO VEHICLE SIGNAL is coupled through selector circuit 112 to AND gate 126 which, as described above, is effective to supply its output over wire 128 to timing circuit 15 for advancing ring counter circuit 14 to its step 27. While ring counter circuit 14 operates in step 26, however, the traffic signals are controlled to display a green aspect for phase C and a red aspect for each of phase A and B, while the pedestrian signals SP1 and SP2 are controlled to display a DONT WALK indication as shown by the polar diagram of FIG. 4 in step 11 thereof.

While ring counter circuit 14 operates in its step 27, its output is coupled to timing circuit 15 through selector circuit 92, over wire $h$ and through variable resistor 54 for measuring a time period during which the vehicle signals and pedestrian signals are controlled. The output from step 27 is also coupled through matrix selection 70 to signal control circuits 73–75 to control the traffic signals to display an amber aspect for phase C and a red aspect for each of phase A and phase B, while controlling the pedestrian signals SP1 and SP2 to display a DONT WALK indication as suggested by the polar diagram of FIG. 4 in step 12 thereof.

At the termination of the time period measured in step 27, ring counter circuit 14 is advanced to its step 28 wherein it operates for a time period measured as its output is applied through AND gate 95, selector circuit 93, over wire $j$ and through resistor 56 to timing circuit 15. AND gate 95 is now effective in that it also receives an input from step X of ring counter circuit 16. The output from step 28 is also coupled through matrix selection 70 to signal control circuits 73–75 to control the traffic signals SA, SB and SC to each display a red aspect, while controlling the pedestrian signals SP1, SP2 and SP3 to display a DONT WALK indication.

At the termination of the time period measured for step 28, ring counter circuit 14 returns to its step 20 wherein it operates for a time period as measured by resistor 46 in that AND gate 30 corresponding to step 20 receives concurrent inputs. That is, selector circuit 134 being in its normal operating condition permits the output of step 28 to be coupled over wire 136 to AND gate 30. Ring counter circuit 14 operates in its step 20 for a measured time period upon application of its output through a switch 148 and variable resistor 46 to timing circuit 15. During such measured time period, the output from step 20 is applied over wire 1 and through matrix selection 70 to signal control circuits 73–75 for controlling the traffic signals to display a green aspect for phase A and a red aspect for each of phase B and phase C, while controlling the pedestrian signal SP2 and SP3 to display a WALK indication as suggested by the polar diagram of FIG. 4 in step 1 thereof.

Upon termination of the time period measured in step 20 of ring counter circuit 14, ring counter circuit 14 is advanced to its step 21 wherein it dwells until a vehicle call or pedestrian call for either or both of phase B and phase C occurs.

It is described above how the traffic signal controller of FIGS. 2A and 2B electronically skips phase A when going from phase B to phase C where a vehicle storage is present in phase C at the termination of phase B operation. Alternatively, a vehicle call may occur on phase C while the traffic signal controller of FIGS. 2A and 2B is in a dwell condition wherein the green aspect for phase A only is displayed. In response to a vehicle call for phase C only, ring counter circuit 14 operates through its steps 22–28 and through step 20 to step 21, but the steps 25–28 are employed to measure time periods for operating the traffic signals for phase C. In this connection, flip-flop 104 remains in its normal operating condition even though step 23 of ring counter circuit 14 is operated in that AND gate 101 receives only one of its two inputs. The selector circuits 90–93 as well as selector circuits 110–114 remain in their normal operating condition wherein the circuits described supra for phase C are electrically connected. Upon completion of operation of step 28, operation of ring counter circuit 14 is returned to step 20 in that selector 134 remains in its normal operating condition. After the time period measured for step 20 of the ring counter circuit 14, it is advanced to step 21 wherein it dwells until a vehicle call or pedestrian call occurs for either phase B or C.

During the operation of the traffic signal controller responsive to each vehicle call, auxiliary ring counter circuit 16 and its timing circuit 17 remain inactive. In response to a pedestrian call for either phase B or phase C, however, ring counter circuit 16 is operated through its steps W, I, F and X designated respectively 150–153 to provide control of the pedestrian signals SP1, SP2 and SP3 according to the phase on which the pedestrian call is stored. In this connection, a functional diagram for phase C pedestrian call is shown in FIG. 5.

As mentioned above, the pedestrian memory flip-flops 83 and 84 store the pedestrian calls for phase B and phase C when the respective pedestrian buttons PBB and PBC are actuated. The storage of each such pedestrian call is effective to set ring counter circuit 14 into operation in the manner described supra as well as to set ring counter circuit 16 into operation. Ring counter circuit 16 when operating through its several steps provides control of the pedestrian signals SP1, SP2 and SP3 according to the phase on which the pedestrian call occurred. Each step W, I and F has its own separate timing circuit, but the last step X of ring counter circuit 16 is without a timing circuit inasmuch as it is a wait or dwell step.

Ring counter circuit 16 includes the steps W or walk, I or initial clearance, F or final clearance and X or wait designated respectively 150, 151, 152 and 153. Ring counter circuit also includes AND gates 155, 156, 157 and 158 associated respectively with the steps 150–153. Each of the AND gates 155–158 receives a first input from the preceding step when operating and a second input from a pulsing circuit 160 when it is controlled by timing circuit 17 at the termination of a measured time period.

Separate timing circuits are provided for each of the steps 150–152 for each of phase B and phase C. Variable resistors 163, 165 and 167 are employed respectively with steps 150–152 to set the time periods for phase C pedestrian control, while variable resistors 164, 166 and 168 corresponding respectively to steps 150–152 are set to measure the time periods for a phase B pedestrian call. At the output of each of the steps 150–152, a selector circuit is provided for coupling the output of its associated step to one of the two resistors according to the phase on which the pedestrian call occurred, the selector circuits being designated respectively 170, 171 and 172. The selector circuits 170–172 are conditioned according to the condition of flip-flop 104 described above concurrently with the conditioning of selector circuits 90–93 and 110–114.

In operation, and assuming a pedestrian call occurs on phase C, pedestrian memory flip-flop 84 stores the pedestrian call and provides a pedestrian output during such storage condition. Such pedestrian output is effective to set ring counter circuits 14 and 16 into operation. More specifically, the pedestrian signal stored in flip-flop 84 is applied through OR gates 87 and 88 to AND gate 65 which provides an output to timing circuit 15 for advancing ring counter circuit 14 to its next step 22. Ring counter circuit 14 then operates through its successive steps 22–24 in the manner described supra for controlling the traffic and pedestrian signals to particular displays as described supra. Following the termination of the measured time period for step 24 as determined by the setting of variable resistor 49, ring counter circuit 14 is advanced to its step 25 for operation. In this connection, AND gate 35 receives its two inputs concurrently at the termination of such measured time period for initiating step 25 into operation. At the same time, the output of AND gate 35 is also applied to AND gate 175 as a first of two inputs, the second of such two inputs being provided when storing a pedestrian call for either phase B or phase C for setting ring counter circuit 16 into operation.

In the present example, the pedestrian memory flip-flop 84 supplies its PEDESTRIAN output through selector circuit 113 and over wire 177 to AND gate 175, such PEDESTRIAN output comprising the second input to AND gate 175. The concurrent application of the first and second inputs to AND gate 175 causes it to provide an output which is applied to pulsing circuit 160. Pulsing circuit 160 is controlled by the input from AND gate 175 to provide an output for advancing ring counter circuit 16 from its step 153 to step 150 inasmuch as AND gate 155 is now receiving its two inputs concurrently.

Step 25 of ring counter circuit 14 and step 150 of ring counter circuit 16 are concurrently set into operation in the manner described and as more specifically suggested by the polar diagram of FIG. 5. Inasmuch as it is assumed that a pedestrian call for phase C is stored, flip-flop 104 remains in its normal operating condition so that the CONTROL input to each of the selector circuits 90–93, 110–114 and 170–172 is not provided causing such selector circuits to remain in their normal operating conditions. In such normal operating conditions in each instance, a circuits completed for phase C.

Ring counter circuit 14 operates in its step 25 for a time period measured by variable resistor 50 as described supra to provide an initial phase C green period as suggested by the polar diagram of FIG. 5 in step 10 thereof. At this same time, the output from step 150 of ring counter circuit 16 is applied through its selector circuit 170 to matrix selection 70 and to signal control circuits 73–75 for controlling the pedestrian signals SP1 and SP2 to display a WALK indication. The time period measured by resistor 163 for phase C is substantially longer than the time period that ring counter circuit 14 remains in its step 25 or No. 10 as suggested by the polar diagram of FIG. 5. The time period measured for step 25 thus terminates to cause ring counter circuit 14 to advance to its next step 26 wherein vehicle extension time periods may be provided as described supra.

In the present example, it is assumed that three vehicles are detected by the vehicle detection apparatus 10 relative to phase C to thus provide three vehicle extension time periods in step 26. Each vehicle detected causes relay VRC to drop away in which condition ground is coupled through its back contact 140 to reset timer 122 to a zero timing condition as described supra for initiating another vehicle extension time period. These three extension time periods are shown in the polar diagram of FIG. 5 as occurring within the time that ring counter circuit 16 operates in its step W designated 150.

At the end of the measured time period for step 150 of ring counter circuit 16, timing circuit 17 provides control of pulsing circuit 160 for advancing ring counter circuit 16 to its next step 151. Ring counter circuit 16 operates in its step 151 for a time period measured by resistor 165 during which the output of step 151 is applied through matrix selection 70 to signal control circuits 73–75 for operating the pedestrian signals SP1 and SP2 to a flashing DONT WALK indication as suggested in step I of the polar diagram of FIG. 5.

Following the last vehicle extension time period measured, ring counter circuit 14 continues to operate in its step 26 in that AND gate 126 is now receiving only two of its required three inputs. That is, AND gate 126 receives its first input from step 26 of ring counter circuit 14 and its second input from selector 112 which is the NO VEHICLE SIGNAL, but not its third input from either step 152 or 153 of ring counter circuit 16. During this time, a maximum extension time period is provided for ring counter circuit 14 to operate in its step 26 even though no vehicles are detected as suggested in step 11 of the polar diagram of FIG. 5 during which time the green aspect is displayed for phase C and the red aspect is displayed for each of phase A and phase B. It is noted here that such maximum extension time period is dependent upon operation of ring counter circuit 16 and may be different than the maximum time period set by either resistor 52 or resistor 53 for step 26 of ring counter circuit 14 when operated responsive to a plurality of successive vehicle calls.

Ring counter circuit 16 is operated to its step 152 after the termination of the time period measured for step 151 wherein it operates for a time period measured by resistor 167 for phase C. During this time period, the output from step 152 is applied through matrix selection 70 to signal control circuits 73–75 for controlling the pedestrian signals SP1 and SP2 to display a flashing DONT WALK indication as suggested in step F of the polar diagram of FIG. 5

At the time that ring counter circuit 16 begins operation in its step 152, AND gate 126 receives its third input through OR gate 127 from step 152 of ring counter circuit 16 to cause ring counter circuit 14 to be advanced to its next step 27 wherein it operates for a time period measured by variable resistor 54. During this measured time period, the output from step 27 of ring counter circuit 14 is applied through matrix selection 70 to signal controller circuits 73–75 for controlling the traffic signals SA and SB to display a red aspect and traffic signal SC to display an amber aspect as suggested in step 12 of the polar diagram of FIG. 5.

It is noted in the polar diagram of FIG. 5 that the time periods of operation for step F designated 152 of ring counter circuit 16 and step 27 of ring counter circuit 14 occur concurrently. This type of operation always occurs inasmuch as the variable resistors 54 and 167 for measuring phase C time periods are gang-tuned as suggested by dotted line 180, while variable resistors 55 and 168 relative to phase B are gang-tuned as suggested by dotted line 181. The feature of having the final pedestrian clearance period and the clearance vehicle period occur concurrently is shown and described in my pending application Ser. No. 293,030 filed on July 5, 1963 as mentioned supra.

Following operation of the clearance steps, ring counter circuits 14 and 16 operate respectively through the all red step 28 and to step 153 prior to the operation of ring counter circuit 14 to its step 20 for a measured time period and then to dwell step 21 wherein the green aspect for phase A is again displayed. Also, in steps 20 and 21, signal control circuits 73–75 control the pedestrian signals SP2 and SP3 to display a WALK indication.

Should a phase B pedestrian call have occurred after the phase C pedestrian call occurred, ring counter circuit 14 would still return to step 20 or phase A inasmuch as the outputs of selector 134 following step 28 are coupled to AND gate 30 associated with step 20 or to step 25 for phase C operation as described supra. In other words, after a phase C pedestrian call, right of away is returned to phase A before a phase B or C pedestrian call is employed to give right of away to the corresponding phase B or phase C.

If it is assumed that a phase B pedestrian call occurs first followed by a phase C pedestrian call, ring counter circuit 14 is operated in the manner described supra for a phase B vehicle call followed by a phase C vehicle call. In this connection, a pedestrian call storage for phase B is supplied from flip-flop 83 through OR gate 86, over wire 100 to AND gate 101 for operating flip-flop 104 to its abnormal condition upon operation of ring counter circuit 14 to step 23 as described supra. Flip-flop 104 then provides a CONTROL output for conditioning all of the selector circuits mentioned above for phase B. Steps 25–28 of ring counter circuit 14 are operated similarly to that described supra relative to steps 150–153 of ring counter circuit 16 for each of phase B and phase C in succession. In this connection, the output from selector 134 following phase B operation is applied to step 25 of ring counter circuit 14 as well as to AND gate 175 and to pulsing circuit 160 according to a phase C pedestrian call storage for again operating ring counter circuit 16 through its different steps.

It may be required that a substantially greater time period is required for phase B or phase C than can be measured by the respective variable resistors 52 and 53. A resistor 183 is provided which may be switched by switch 107 into the timing circuit for step 26 and the selected phase B or phase C to extend the time period substantially beyond the maximum time period measured by the selected resistor 52 or 53.

The traffic signal controller of FIGS. 2A and 2B may be included in a coordinated system such that it is operated responsive to receive offset and cycle split signals for each of phase B and phase C. One such system for supplying such offset and cycle split signals is shown and described in the above mentioned pending application Ser. No. 239,714 filed on November 23, 1962 by J. H. Auer, Jr. et al. To utilize received offset signals for phase B and phase C, switch 66 is switched to the offset signal terminal to which is applied phase B and phase C offset signals in a manner well known in the art. In this connection, a vehicle call or pedestrian call for either of phase B or phase C is ineffective to operate ring counter circuit 14 out of its dwell step 21 until such time as the offset signal for phase B or phase C is applied. At such time, AND gate 65 is effective to couple the output from step 21 of ring counter circuit 14 to timing circuit 15 for controlling ring counter circuit 14 to its next step 22.

Switch 107 when switched to the output of selector circuit 185 couples a phase B and phase C split signal to timing circuit 15 over wire g to advance ring counter circuit 14 from its step 26 to step 27 for either of phase B or phase C operation. It is noted here that the phase B split signal has no effect if selector circuit 185 is operating in its normal operating condition in response to a phase C vehicle call. This feature permits ring counter circuit 14 to operate in its step 26 until the phase C split signal is received during which time a green aspect is provided for phase C until AND gate 126 receives its NO VEHICLE SIGNAL following the termination of the last vehicle extension time period measured.

EMBODIMENTS OF FIGS. 6A–6D

The embodiment of FIGS. 6A–6D will now be considered with reference to the polar diagrams of FIG. 4 and FIG. 10 and with reference to the description provided for the embodiment shown in FIGS. 2A and 2B. FIG. 7 shows the sheet arrangement of the drawing in FIG. 6.

Referring now to FIGS. 6A–6D, a ring counter circuit 190 is shown which includes a plurality of steps for each of phase A, phase B and phase C for operating the vehicle traffic signals SA, SB and SC and pedestrian signals SP1, SP2 and SP3. In this connection, ring counter circuit 190 is operative through its different steps for vehicle calls and/or pedestrian calls for each or both of phase B and phase C without requiring the use of an auxiliary ring counter circuit such as ring counter circuit 16 shown in FIG. 2B.

Ring counter circuit 190 includes steps 20–24 and associated AND gates 31–34 for phase A operation similar to the ones shown for ring counter circuit 14 of FIGS. 2A and 2B. For phase B operation, steps 25', 26', 27' and 28' with associated AND gates 36', 37' and 38' are provided for operating the traffic and pedestrian signals, while steps 150' and 151' with associated AND gates 156' and 157' are provided for operating pedestrian signals. For phase C operation, steps 25", 26", 27"'and 28" with associated AND gates 36", 37" and 38" are provided for operating the traffic and pedestrian signals and steps 150" and 151" with associated AND gates 156" and 157" are provided operating the pedestrian signals. It is noted here that in the embodiment of FIGS. 2A and 2B, the same steps of ring counter circuit 14 are employed with either a phase B or phase C vehicle call to operate the traffic and pedestrian signals and, in addition, the same steps of ring counter circuit 16 are employed with either a phase B or phase C pedestrian call to operate the pedestrian signals. In the present embodiment, however, separate steps are employed as described supra with ring counter circuit 190 for each of phase B and phase C for either a vehicle call or pedestrian call. However, the feature of electronically skipping unwanted steps such as, for example, the steps for phase B when operating from the phase A steps is accomplished in the traffic signal controller of FIGS. 6A–6D by included gating means responsive to vehicle call or pedestrian call storages.

In operation, ring counter circuit 190 dwells in its step 21 as similarly described supra with reference to ring counter circuit 14. Upon occurrence of a vehicle call or pedestrian call for either of phase B or phase C, however, ring counter circuit 190 operates through its steps 22, 23 and 24 in the manner described supra to control the traffic and pedestrian signals as described with reference to steps 3, 4 and 5 of the polar diagram shown in FIG. 4. More specifically, assuming that the initial vehicle detected is detected on phase B, flip-flop 80 supplies a vehicle storage signal through OR gate 86 to AND gate 65 which permits the ring counter circuit 14 to be advanced from step 21 and through successive steps 22 and 23 to step 24.

Step 24 of ring counter circuit 190 corresponding to the all red step 5 of the polar diagram of FIG. 4 applies its output to a three-input AND gate 192 associated with step 25' and to a three-input AND gate 193 associated with step 25" through an OR gate 194 over a wire 195. However, only one of the two three-input AND gates 192 and 193 concurrently receives its three inputs for advancing ring counter circuit 190 to the next step. The second input for AND gate 192 is derived from a phase B permissive circuit 197 only at the time that a vehicle or pedestrian call is stored by one of the respective flip-flops 80 and 83. Similarly, the second input for AND gate 193 is derived from a phase C permissive circuit 198 only when a vehicle or pedestrian call is stored by one of the respective flip-flops 81 and 84. The third input to AND gates 192 and 193 occurs when the time period for step 24 is measured following which timing circuit 15 and pulsing circuit 42 are controlled.

Phase B permissive circuit 197 and the phase C permissive circuit 198 each includes a manual starting circuit for the purpose of conditioning such circuits for a normal ON condition. Each circuit includes a manually controllable button coupled to (+) energy, these buttons being designated 200 and 201 for respective permissive circuits 197 and 198. When permissive circuits 197 and 198 are in their respective normal ON conditions, each is ineffective to provide the second input to its respective AND gate 192 and 193. It is only when a vehicle call or pedestrian call occurs for phase B or phase C that the corresponding phase B or phase C permissive circuit is operated to its OFF condition wherein the second input to the respective AND gate 192 or 193 is provided.

In the present example, it is assumed that flip-flop 80 is operated to an abnormal condition in response to a vehicle call to provide at its output a VEHICLE signal. Such VEHICLE signal is coupled through OR gate 86 and over wire 103 to AND gate 204. AND gate 204 also receives an input from phase C permissive circuit 198 over wire 205. If phase C permissive circuit 198 is in its normal ON condition, AND gate 204 provides an output which is coupled to phase B permissive circuit 197 through switch 206 for operating it from its normal ON condition to its OFF condition. The second input to AND gate 192 is then provided by phase B permissive circuit 197 so that it may couple the output from step 24 to step 25' when pulsing circuit 42 provides its pulsed output. Ring counter circuit 190 then operates in its step 25' for a time period measured by variable resistor 51 during which the output from step 25' is applied over wire f' and through matrix selection 70 to signal control circuits 73–75 for controlling the traffic signals display a green aspect for phase B and a red aspect for each of phase A and C, while also controlling the pedestrian signals to display a DONT WALK indication for signals SP1 and SP3.

At the termination of the measured time period for step 25', ring counter circuit 190 is advanced to its next step 150'. Ring counter circuit 190 quickly advances through step 150' inasmuch as there is no pedestrian call stored for phase B as determined by the condition of a pedestrian signal memory flip-flop 207. More specifically, in its non-storage condition, flip-flop 207 provides a NO PEDESTRIAN SIGNAL at its output which is coupled to AND gates 214 and 217 for conditioning such AND gates. Upon operation of step 150', its output is coupled to AND gate 214 which when conditioned couples its output over wire 215 to timing circuit 15 for advancing ring counter circuit 190 to its next step 151'. The output from step 151' is coupled to AND gate 217 which when conditioned couples its output over wire 218 to timing circuit 15 to advance ring counter circuit 190 to its next step 26'. In other words, ring counter circuit 190 rapidly passes through steps 150' and 151' when operating from steps 25' to step 26' for a vehicle call on phase B without operating the traffic and pedestrian signals. It is here contemplated that signal control circuits 73–75 are sufficiently slow in operation so as to maintain the vehicle signals and pedestrian signals controlled as suggested in step 6 of the polar diagram of FIG. 4 during the minute time required to operate through steps 150' and 151' prior to reaching step 26'.

Ring counter circuit 190 operates in its step 26' for a time period measured by the setting of variable resistor 53 as its output is coupled through such resistor 53 and switch 107 to timing circuit 15 over wire g. Variable resistor 53 is set to measure a maximum extension time period for permitting a maximum number of vehicles to enter and leave the intersection from phase B when successively detected and described supra. The output from step 26' is also coupled to timer 122 through extension resistor 120 to start it timing from its zero timing condition for a vehicle extension time period measured by resistor 120 during which the detected vehicle is permitted to enter and leave the intersection from phase B.

According to the polar diagram of FIG. 4, five such vehicle extension time periods are provided by way of example in response to a like number of vehicles detected. The detection of each such vehicle causes timer 122 to be reset to its initial timing condition. More specifically, the output from step 26' is coupled over wire 220 to AND gate 221 which upon receiving a RESET input through back contact 124 of relay VRB provides an output which is coupled to a one-shot multivibrator 223 through an OR circuit 224. One-shot multivibrator 223 operates from its normal operating condition to an abnormal operating condition for a time interval during which is provided a RESET signal coupled to timer 122 over wire 225 for resetting the timer 122 to its zero timing condition. Each of the vehicles detected on phase B thus operate timer 122 upon operation of relay VRB when that vehicle is detected for providing the five vehicle extension time periods suggested by the polar diagram of FIG. 4 in step 7 thereof. During each such vehicle extension time period, the output from step 26' of ring counter circuit 190 is applied over wire g' to signal control circuits 73–75 through matrix selection 70 for controlling the traffic signals to display a green aspect for phase B and a red aspect for each of phase A and C while controlling the pedestrian signals to display a DONT WALK indication for signals SP1 and SP3.

Vehicle memory flip-flop 80 remains in its vehicle storage condition as long as closely-spaced vehicles are detected to repeatedly reset timer 122 to its zero timing condition. Flip-flop 80 is restored to its normal operating condition, however, upon measurement of the last vehicle extension time period by timer 122. More specifically, while ring counter circuit 190 operates in its step 26', an output from step 26' is coupled to an AND gate 226 over a wire 227 for conditioning such AND gate 226. Upon measurement of the last vehicle extension time period by timer 122, timer 122 provides a CANCEL output which is coupled through AND gate 226 to flip-flop 80 for cancelling its vehicle storage. Such CANCEL output is also coupled to pulsing circuit 42 for advancing ring counter circuit 190 from its step 26' to step 27' through AND gate 37'.

Ring counter circuit 190 operates in step 27' for a time period measured by variable resistor 55 which couples the output of step 27' to timing circuit 15 over wire i. During this measured time period, the output of step 27' is also applied over wire i to signal control circuits 73–75 through matrix selection 70 for controlling the traffic signals to display an amber aspect for phase B and a red aspect for each of phase A and phase C, while controlling the pedestrian signals to display a DONT WALK indication for signals SP1 and SP3 as suggested in step 8 of the polar diagram shown in FIG. 4.

Following the termination of the measured time interval for step 27', ring counter circuit 190 is advanced to its step 28' through AND gate 38'. In step 28', a time period is measured by variable resistor 57 during the time that the output of step 28' is coupled over wire k and through resistor 57 to timing circuit 15. As suggested by the polar diagram of FIG. 4, step 9 is the all red interval during which the traffic signals display their red aspects and the pedestrian signals SP1, SP2 and SP3 display a DONT WALK indication.

Upon termination of the measured time period during which ring counter circuit 190 operates in its step 28', step 28' provides an output which is applied through OR circuit 194 to AND gate 193 as its third input. The second input to AND gate 193 is supplied from phase C permissive circuit 198 when it is operating in its OFF condition, while the first input is supplied to AND gate 193 upon operation of pulsing circuit 42.

The phase C permissive circuit 198 is operated from its normal ON condition to its OFF condition dependent upon a vehicle or pedestrian call in phase C and provided phase B permissive circuit 197 is operating in its ON condition. More specifically, it is described supra how phase B permissive circuit 197 is operated from its normal ON condition to its OFF condition in response to a vehicle call on phase B and phase C permissive circuit 198 being in its ON condition. Phase B permissive circuit 197 having been operated to its OFF condition is reset to its normal ON condition when ring counter circuit 190 operates in its step 26' from which an output is supplied through OR gate 230 to reset phase B permissive circuit 197 to its normal ON condition. Phase C permissive circuit 198 is operated from its normal ON condition to its OFF condition as soon thereafter as a vehicle call or pedestrian call is stored for phase C. More specifically, phase C permissive circuit 198 receives an input signal from AND gate 231 provided for operating it from its normal ON condition to its OFF condition over wire 232 and through switch 233 when it concurrently receives a VEHICLE signal from flip-flop 81 through OR gate 87 and over wire 235 and a signal from phase B permissive circuit 197 when operating in its normal ON condition.

Upon measurement of the time period for step 28' of ring counter circuit 190, it is advanced to its step 25" in that AND gate 193 concurrently receives its three inputs. Ring counter circuit 190 operates in its step 25" for a time period measured by variable resistor 50 during the time that its output is coupled over wire *e* and through resistor 50 to timing circuit 15. During this measured time period, the output of step 25″ is also coupled over wire *e*′ to signal control circuits 73–75 through matrix selection 70 for controlling the traffic signals to display a green aspect for phase C and a red aspect for each of phase A and phase B while also controlling the pedestrian signals to display a DONT WALK indication for signals SP1 and SP2 as suggested in step 10 of the polar diagram of FIG. 4.

Upon termination of the measured time period for step 25″, ring counter circuit 190 is advanced to its step 150″ through AND gate 36″. Ring counter circuit 190 is immediately advanced to its next step 151″ inasmuch as pedestrian signal memory flip-flop 236 is operating in its normal condition wherein it provides a NO PEDESTRIAN SIGNAL output to condition AND gates 237 and 238. Upon operation of step 151″, its output is coupled to AND gate 237 which provides an output coupled to timing circuit 15 over wire 239 for advancing ring counter circuit 190 to its step 151″. Upon operation of step 151″, its output is coupled to AND gate 238 which provides an output coupled to timing circuit 15 over wire 239 for advancing ring counter circuit to its step 26″. It is contemplated that signal control circuits 73–75 be sufficiently slow in operation such that they continue to operate the traffic and pedestrian signals as suggested in step No. 10 of the polar diagram of FIG. 4 until ring counter circuit 190 operated in its step 26″. In the absence of a pedestrian call for phase C, steps 150″ and 151″ are electronically skipped.

Ring counter circuit 190 operates in its step 26″ to provide vehicle extension time periods as suggested, for example, by the polar diagram of FIG. 4. More specifically, the output from step 26″ is applied through the phase C extension resistor 143 to start timer 122 measuring a vehicle extension time period from a zero timing condition. Timer 122 is reset to a zero timing condition prior to measuring the vehicle extension time period upon detecting another vehicle which causes relay VRC to drop away. The resetting circuit includes AND gate 240 which receives one of its two inputs from step 26″ and the other input through back contact 140 of relay VRC when dropped away, OR gate 224 and one-shot multivibrator 223. Timer 122 provides a CANCEL output upon measurement of the vehicle extension time period for the last detected vehicle which is simultaneously applied to pulsing circuit 42 and flip-flop 81 through AND gate 241. Pulsing circuit 42 is controlled by such CANCEL output to advance ring counter circuit 190 to its step 27″ through AND gate 37″, while flip-flop 81 is operated to its normal operating condition. During the time period that step 26″ is operating, however, its output is coupled over wire *g*″ to signal control circuits 73–75 through matrix selection 70 to control the traffic signals to display a green aspect for phase C and red aspect for each of phase A and phase B, while controlling the pedestrian signals to display a DONT WALK indication for signals SP1 and SP2 as suggested in step 11 of the polar diagram of FIG. 4.

While ring counter circuit 190 operates in its step 26″, phase C permissive circuit 198 is reset to an ON condition in that the output from step 26″ is applied through an OR circuit 242 to phase C permissive circuit 198 as a reset signal. The second input coupled to AND gate 193 provided by phase C permissive circuit 198 is removed.

Ring counter circuit 190 operates in its step 27″ for a time period measured by resistor 54 when its output is applied over wire *h* and through resistor 54 to timing circuit 15. During this measured time period, its output is also coupled over wire *h*′ to signal control circuits 73–75 through matrix selection 70 to control the traffic signals to display an amber aspect for phase C and a red aspect for each of phase A and phase B, while controlling the pedestrian signals to display a DONT WALK indication for signals SP1 and SP2.

Upon termination of the measured time interval for step 27″, ring counter circuit 190 is advanced to its step 28″ through AND gate 38″ wherein it operates for a time period measured by resistor 56 when its output is coupled over wire *j* and through resistor 56 to timing circuit 15. During such measured time period, the output from step 28″ is coupled over wire *j*′ to signal control circuits 73–75 through matrix selection 70 to control the traffic signals to each display a red aspect, while controlling the pedestrian signals to each display a DONT WALK indication.

Upon termination of the measured time period for step 28″ of ring counter circuit 190, pulsing circuit 42 is controlled to provide a pulsed output. Inasmuch as all of the steps of the ring counter circuit 190 are then in a non-operating condition, a start circuit 246 associated with step 20 is rendered effective by a check circuit 247 to initiate step 20 into operation. The specific manner in which the step circuit 246 is operated by check circuit 247 responsive to the non-operation of all steps in ring counter circuit 190 will be more specifically described infra when considering the detailed circuits shown in FIG. 8. It is noted that this feature of employing a check circuit responsive to the non-operating condition of all steps in a ring counter circuit is shown and described in my pending application Ser. No. 293,030, filed on July 5, 1963.

Ring counter circuit 190 operates in its step 20 for a time period measured by resistor 45 following which ring counter circuit 190 is advanced to its step 21 wherein it dwells until a vehicle call or pedestrian call for either of phase B or phase C occurs. During the measured time period that ring counter circuit 190 operates in its step 20, its output is applied over wire 1 to signal control circuits 73–75 through matrix selection 70 to control the traffic signals to display a green aspect for phase A and a red aspect for each of phase B and phase C, while controlling the pedestrian signals to display a WALK indication for signals SP2 and SP3.

Should a vehicle call occur on phase B only and not on phase C as described, ring counter circuit 190 operates through its steps including step 28′ successively as described supra following which it would be returned to its step 20 inasmuch as AND gate 193 is ineffective to couple the output of step 28′ to step 25″ since phase C permissive circuit 198 is operating in its normal ON condition. Check circuit 247 is effective upon non-operation of all the steps in ring counter circuit 190 to control start circuit 246 which initiates step 20 into operation. The steps of ring counter circuit 190 allotted to phase C are electronically skipped.

If, on the other hand, a vehicle call occurs for phase C only and not phase B, phase C permissive circuit 198 is operated from its normal ON condition to an OFF condition wherein it provides the second input to AND gate 193 so that ring counter circuit 190 is advanced from its step 24 to its step 25″ electrically skipping the steps alloted to phase B. In this instance, phase B permissive circuit 197 operates at its normal ON condition which prohibits AND gate 192 from coupling the output of step 24 to step 25′. Initially, ring counter circuit 190 operates from its dwell step 21 when concurrently receiving the three inputs to AND gate 250, one input from step 21, a second input from flip-flop 81, for example, and third input through switch 251 from (+).

Assuming that the traffic signal controller of FIG. 6 is in a normal non-actuated condition such that step 21 of ring counter circuit 190 is operating, description of FIG. 6 will now be provided for the condition where a pedestrian call occurs on phase C only as suggested by the polar diagram of FIG. 10. In addition, it is further suggested that three vehicle extension time periods be measured for phase C responsive to the detection of three closely-spaced vehicles on phase C immediately following the initial green period in step 10.

Upon occurrence of a first vehicle call in phase C, ring counter circuit 190 operates through its steps 22–24 and into step 25" upon coupling of the output of step 24 to AND gate 193 over wire 195 and through OR gate 194. AND gate 193 couples its output to step 25" and to AND gate 253 which when concurrently receiving a pedestrian signal from flip-flop 84 sets flip-flop 236 to its abnormal condition of operation. In this connection, AND gate 193 receives its second input from phase C permissive circuit 198 in that it now is operating in its OFF condition as caused by the PEDESTRIAN SIGNAL output of flip-flop 84 coupled thereto through OR gate 87 and the circuit described supra. Flip-flop 236 in its abnormal condition provides a PEDESTRIAN SIGNAL output to AND gate 254. While flip-flop 81 is storing a vehicle call, its VEHICLE SIGNAL output is coupled to AND gate 254 along with the PEDESTRIAN SIGNAL from flip-flop 236 and the output from step 25" which together prevent AND gate 254 from providing its output. However, the output of step 25" is coupled over wire e and through variable resistor 50 to timing circuit 15 so that a time period is measured for step 25" of ring counter circuit 190 as suggested in the polar diagram of FIG. 10 in step 10 thereof. During such measured time period, the output from step 25" is coupled over wire e' to signal control circuits 73–75 through matrix selections 70 to control the traffic signals to display a green aspect for phase C and a red aspect for each of phase B and phase C, while controlling the pedestrian signals to display a DONT WALK non-flashing indication for the signals SP1.

Upon termination of the measured time period for step 25" of ring counter circuit 190, pulsing circuit 42 becomes effective to advance ring counter circuit 190 to its step 150" through AND gate 36". Ring counter circuit 190 operates in step 150" for a measured time period set by a resistor 258 when the output of step 150" is applied to timing circuit 15 over wire o and through resistor 258. During this measured time period, the output of step 150" is also applied over wire o' to signal control circuits 73–75 through matrix selection 70 for controlling the traffic signals to display a green aspect for phase C and red aspect for each of phase A and phase B, while controlling the pedestrian signals to display a WALK indication for signals SP1 and SP2 as suggested in step W of the polar diagram of FIG. 10.

Upon termination of the measured time period for step 150", ring counter circuit 190 is advanced to its next step 151" through AND gate 156" wherein it operates for a measured period as determined by variable resistor 259 through which the output of step 151" is applied over p to timing circuit 15. The output from step 151" is also coupled to signal control circuits 73–75 over wire p and through matrix selection 70 to control the traffic signals to display a green aspect for phase C and a red aspect for each of phase A and phase B, while controlling the pedestrian signals to display a DONT WALK flashing indication for signals SP1 and SP2 as suggested in step I of the polar diagram of FIG. 10.

Ring counter circuit 190 is operated to its step 26" upon termination of the measured time period for step 151" through AND gate 157". Depending upon the number of vehicles detected on phase C, ring counter circuit 190 operates in its step 26" for a number of vehicle extension time periods within the maximum extension time set by variable resistor 52 as described supra. Three such vehicle extension time periods are suggested in step 11 of the polar diagram of FIG. 10 for three closely-spaced vehicles which are detected on phase C.

The detection of each vehicle on phase C causes timer 122 to be reset to its zero timing condition from which it times another vehicle extension time period while ring counter circuit 190 operates its step 26" in the manner described supra. In the absence of a further vehicle detector, however, timer 122 is permitted to entirely time that last-measured vehicle extension time period whereupon it provides a CANCEL output which is coupled to AND gate 241 and to pulsing circuit 42 as described supra for respectively resetting flip-flop 81 and advancing ring counter circuit 190 to its next step 27". Ring counter circuit 190 then operates as described in step 27" for a measured time period following which it operates in step 28" for a measured time period. Upon termination of the measured time period for step 28", a check circuit 247 and start circuit 246 becomes effective to operate ring counter circuit 190 to its step 20. Ring counter circuit 190 is returned to its dwell step 21 following the operation of step 20 for its measured time period.

Should a pedestrian call only occur on phase C without any vehicle calls, ring counter circuit 190 electronically skips its step 25" in that AND gate 254 is effective to couple its output over wire 239 to timing circuit 15 to immediately advance ring counter circuit 190 to its next step 150". There would be no step 10 as suggested by the polar diagram of FIG. 10. In addition, ring counter circuit 190 operates in its step 26" only for one vehicle extension time period and this is provided so that step 26" will operate sufficiently long to provide a cancel output for cancelling the pedestrian storage in memory flip-flop 236. In this connection, flip-flop 84 is operated to its normal non-storage condition upon transfer of operation between steps 150" and 151" as the output from AND gate 156" is coupled to flip-flop 84 over wire 260.

Should only a pedestrian call occur on phase B but not on phase C, ring counter circuit 190 is initiated into operation in the manner described supra and operates through the steps allotted to phase A and phase B, but not phase C. In this connection, flip-flop 107 is operated to its abnormal condition when ring counter circuit 190 operates from its step 24 to its step 25' during which time flip-flop 207 is operated to its abnormal condition when AND gate 261 receives its two inputs. In the absence of a vehicle call on phase B, however, ring counter circuit 190 electronically skips its step 25' in that AND gate 262 then receives its three inputs to permit the output AND gate 262 to be coupled to timing circuit 15 over wire 264. Ring counter circuit 190 immediately advances to its step 150' wherein a time period is measured by resistor 266 when its output is applied over wire m to timing circuit 15. Its output is also coupled to the signal control circuits 73–75 over wire m' and through matrix selection 70 to appropriately control the traffic and pedestrian signals. Upon termination of the measured time period for step 150', ring counter circuit 190 advances to its next step 151' wherein it operates for a time period measured by resistor 267 when its output is supplied to timing circuit 15 over wire n. Its output is also applied to the signal control circuits 73–75 over wire n' and through matrix selection 70 for appropriately controlling the traffic and pedestrian signals. In operating from step 150' to step 151' through AND gate 156', a cancel output is supplied from AND gate 156' over wire 269 to pedestrian memory flip-flop 83 for restoring it to its normal operating condition. Upon operation of step 26', the output therefrom is also applied to phase B permissive circuit 197 for resetting it to its normal ON condition. Ring counter circuit 190 operates from its step 28' through step 20 back to step 21 wherein it dwells in the absence of a phase C vehicle or pedestrian call.

In order that ring counter circuit 190 operate again to the phase A step 20 from phase B step 28', it is required that phase C permissive circuit 198 be in its normal ON condition. To insure that it is in its normal ON condition, AND gate 271 is rendered effective at the time that ring counter circuit 190 transfers operation between its steps 26' and 27' and assuming flip-flops 81 and 84 are operating in their normal conditions, i.e., no vehicle call or pedestrian call is stored for phase C. In this operation, AND gate 271 receives both a NO VEHICLE signal coupled from flip-flop 81 over wire 256 to OR gate 270 and a NO PEDESTRIAN signal coupled from flip-flop 84 over wire 273 to OR gate 270 from which each is coupled to AND gate 271 over wire 274. With phase C permissive circuit 198 in its normal ON condition, AND gate 193 prevents transfer of operation to step 25" from step 28' which causes step 20 to then operate.

It is contemplated that the traffic signal controller of FIG. 6 may be employed in a coordinated system wherein offset and split signals are provided to the controller from a system such as shown and described in the pending application Ser. No. 239,714 mentioned supra. In this connection, it is contemplated that the switches 66, 251 and 107 be manually controlled to their second positions each of which is respectively connected to the coordinated system.

In general, a phase B offset signal occurring at the count time 00–19, for example, is effective to control AND gate 65 such that ring counter circuit 190 remains in its step 21 even though a vehicle call or pedestrian call occurs on phase B until such phase B offset signal arrives. Similarly, a phase C offset signal having the count time 20–40, for example, is applied to AND gate 250 such that AND gate 250 is only rendered effective during the presence of such phase C offset signal and upon occurrence of a phase C pedestrian call or vehicle call to operate ring counter circuit 190 from its step 21 and through the appropriate steps assigned to phase C.

In the presence of a phase B vehicle call or pedestrian call only, phase B permissive circuit 197 is operated to its OFF condition by the phase B offset signal for permitting operation in the steps of ring countercircuit 190 allotted to phase A and phase B. The occurrence of the phase C offset signal then has no effect in that ring counter circuit 190 is not operating in its step 21. However, the phase C offset signal is applied over wire 275 to phase C permissive circuit 198 to operate it to its OFF condition. In order that ring counter circuit 190 does not operate in its steps allotted to phase C, phase C permissive circuit 198 is operated to its normal ON condition by an input received from AND gate 271 when ring counter circuit 190 transfers operation between its steps 26' and 27' and in the absence of a phase C vehicle or pedestrian call storage as described supra.

Should a pedestrian call or vehicle call be stored for phase C instead, phase B permissive circuit 197 is initially operated to its OFF condition by the phase B offset signal but is again operated to its ON condition upon occurrence of the phase C offset signal with ring counter circuit 190 in its step 21 through AND gate 276 and OR gate 230. With phase C storage, AND gate 250 is rendered effective in the presence of the phase C offset signal to operate ring counter circuit 190 from its step 21 and through the steps for phase A and the steps for phase C. In this connection, phase C permissive circuit 198 is operated to its OFF condition wherein it provides the second input to AND gate 193 permitting ring counter circuit 190 to operate through its steps for phase C. In step 26", the output of that step is supplied to phase C permissive circuit 198 through OR gate 242 to operate such circuit to its normal ON condition. The ring counter circuit 190 operates then in its normal way to its dwell step 21. While operating in step 21, and upon occurrence of the phase B split signal, AND gate 277 couples its output through OR circuit 242 to phase C permissive circuit 198 to insure that it is operating its normal ON condition.

The phase B split signal demarcated the maximum time period during which vehicle extension time periods can be measured for phase B, while the phase C split signal demarcated the maximum time period during which vehicle extension time periods can be measured for phase C. More specifically, while ring counter circuit 190 operates in its step 26' in which phase B vehicle extension time periods may be measured, its output is coupled to AND gate 280 which upon receiving the phase B split signal couples its output through switch 107 over wire g to timing circuit 15 for advancing ring counter circuit 190 to its step 27'. Similarly, when ring counter circuit is operating in its step 26" in which vehicle extension time periods for phase C may be measured, its output is coupled to AND gate 281 which is effective upon receiving the phase C split signal to couple such output to timing circuit 15 over wire 282, switch 107 in its second position and wire g to advance the ring counter circuit 190 to its next step 27".

DESCRIPTION OF DETAILED CIRCUITS OF FIGS. 8A, 8B AND 8C

The detailed circuits illustrated in FIGS. 8A, 8B and 8C illustrate in part a portion of the traffic signal controller shown in FIG. 6 and described supra. It is intended in FIGS. 8A, 8B and 8C to show in sufficient detail one form of those circuits shown in block form in FIG. 6 which are not shown or described in my above mentioned pending application Ser. No. 293,030 or the above mentioned pending application Ser. No. 283,105 of which I am co-inventor.

Ring counter circuit 190 includes a silicon controlled switch S hereinafter referred to as a "switch" for each of the steps referred to in FIG. 6, a portion of which are shown in FIGS. 8A, 8B and 8C. More specifically, and referring to FIGS. 8A, 8B and 8C, ring counter circuit 190 includes switches S1, S2, S5–S9, S10, S11 and S13. It is noted that each of these switches is numbered corresponding to its step No. of the ring counter circuit 190 shown in FIG. 6. For example, switch S2 corresponds to dwell step No. 2 designated 21 of ring counter circuit 190 shown in FIG. 6.

Each of the silicon controlled switches S1, S2, etc. includes an anode A, a cathode C, an anode gate AG and a cathode gate CG. Each of the anodes A is coupled to (+) energy through a normally energized transistor Q3 included in pulsing circuit 42. Each cathode C is connected to ground through a cathode resistor, these resistors being designated respectively 290–299. In this connection, switch S7 includes a second cathode resistor 300, the purpose of which will be described infra.

Each of the anode gates AG for the switches S is connected to (+) energy through a biasing resistor 302 for stability purposes. Each such anode gate AG except the anode gate AG for switch S1 is coupled through a diode to the AND gate associated with the previously positioned switch S, these diodes being designated 303–310. Each of the two-input AND gates illustrated in FIG. 6 includes a resistor coupled to (+) energy and a capacitor coupled to the output resistor of its associated switch. For example, AND gate 31 includes resistor 312 coupled to (+) energy and capacitor 313 coupled to the top side of cathode resistor 290 of switch S1.

Pulsing circuit 42 includes P-N-P type transistor Q3 having its collector coupled to ground through resistor 315, its emitter coupled to (+) energy and its base coupled to ground through a resistor 316 and to the output of timing circuit 15 as well as the output of timer 122. In this connection, the output of each of timing circuit 15 and timer 122 is considered to be at ground potential such that transistor Q3 is normally biased into conduction. (+) energy is then applied through transistor Q3 to the anodes A of the switches S.

Check circuit 247 includes a P-N-P type transistor Q4 having its emitter coupled to the anode circuits A of the switches S, its collector coupled to ground through a resistor 317 and its base coupled to ground through a resistor 318 and to (+) energy through a resistor 319 and transistor Q3 of pulsing circuit 42.

In operation, only one of the silicon controlled switches S is permitted to conduct when the ring counter circuit 190 is operating in a given step. A time period is measured for that step during which time its output is coupled to timing circuit 15 through a variable resistor and to the signal control circuits 73–75 for appropriately controlling the traffic and pedestrian signals. More specifically, upon application of energy and before any of the switches S is rendered operative, the capacitor in each of the AND gates is charged. For example, capacitor 313 is charged through the circuit including resistor 290 and resistor 312 from ground to (+) energy. Switch S1 is started into operation in that check circuit 247 becomes effective inasmuch as all of the switches S are non-conductive. More specifically, the base of transistor Q4 is biased by the circuit including resistors 318 and 319 and transistor Q3 in pulsing circuit 42. Transistor Q4 then conducts through the circuit including transistor Q3, resistor 320, transistor Q4 and resistor 317. Capacitor 321 also discharges through the circuit including transistor Q4. As transistor Q4 conducts, a positive pulse is applied to cathode gate CG of switch S1 through diode 323 to gate ON switch S1. Switch S1 conducts causing the capacitor 313 to be discharged. At the termination of the measured time period, timing circuit 15 couples a positive-going output to the base of transistor Q3 which momentarily cuts off transistor Q3 thus removing the (+) energy from the anode A of switch S1 causing it to be cut off. Capacitor 313 then rapidly charges causing a negative (−) input to be applied through diode 303 to anode gate AG of switch S2 causing it to conduct. It is noted here that this is the manner in which operation between the different switches S occurs upon termination of the measured time period for the respective switches.

Phase B permissive circuit 197 and phase C permissive circuit 198 each includes a silicon controlled switch, these being designated S14 and S15 respectively. Each includes an anode A, a cathode C, an anode gate AG and a cathode gate CG. The anode A of each such switch S14 and S15 is coupled to (+) energy, while respective cathodes C are coupled to ground through respective resistors 323 and 324. The cathode gate CG for each of the switches S14 and S15 is coupled to its cathode C through a resistor, these resistors being respectively 325 and 326. Manual start buttons 200 with switch S14 and 201 with switch S15 couple (+) energy to the respective cathode gates CG when actuated for starting their respective switch into conduction. The anode gate AG for each of the switches S14 and S15 is coupled to an external turn ON circuit through respective diodes 328 and 329. The cathode C of switches S14 and S15 are each coupled to an external turn OFF circuit through respective capacitors 331 and 332.

In FIG. 8, switches 65 and 261 are shown in position to couple respective phase B offset signal and phase C offset signal to respective AND gates 65 and 250. The circuitry shown in detail is for the purpose of better understanding of the use of such offset signals and also one described use of the phase B split signal. In this connection, switch 107 is not shown but it should be understood that it is in its second position wherein the phase B offset signal and the phase C offset signal are effective according to the operation of ring counter circuit 190 when applied successively to AND gates 280 and 281 in the manner described supra. It is also noted that switches 206 and 233 are now in their second positions which disconnects electrically the respective circuits for turning off phase B permissive circuit 197 and phase C permissive circuit 198 responsive to vehicle or pedestrian calls as descriped supra.

In operation, and assuming a phase B vehicle or pedestrian call occurs, AND gate 65 operates to couple (+) energy directly to timing circuit 15 for advancing ring counter circuit 190 of its step 21 and into step 22. More specifically, the output of switch S2 in step 21 is applied to a diode 334 causing it to be back-biased. The occurrence of a phase B vehicle call or phase B pedestrian call causes the respective flip-flop 80 or flip-flop 83 to be operated to its abnormal condition wherein it couples an output through OR gate 86 to AND gate 65. With flip-flops 80 and 83 in their normal operating conditions, a circuit is completed through OR gate 86 which includes diodes 336 and 337 and resistor 338 in AND gate 65 causing diode 340 in AND gate 65 to be back-biased. However, upon operation of flip-flop 80 or flip-flop 83 to its abnormal condition, diodes 336 and 337 in OR gate 86 are effectively back-biased so that the circuit just described is not completed. A third circuit including resistor 341 and diode 342 completes a circuit through resistor 338 to (+) to back-bias diode 340 until the phase B offset signal is applied. It is assumed that the phase B offset signal is positive-going for the period 00–19, for example, to cause diode 342 to be back-biased.

Upon completion of all three conditions mentioned above, diode 340 is forward biased which permits application of (+) energy through resistor 338 and diode 340 to timing circuit 15 for advancing ring counter circuit 190. The phase B offset signal is also coupled over wire 272 to the cathode C of switch S14 in phase B permissive circuit 197 through a diode 344 and capacitor 331 causing switch S14 to cut off.

In the normal condition of phase B permissive circuit 197 wherein switch S14 conducts, a positive-going signal is taken from the top of resistor 323 and coupled through a resistor 345 to the base of transistor Q6 included in the anode A circuit of switch S6 in ring counter circuit 190. Transistor Q6 being a P-N-P type transistor is normally cut off by such positive-going signal, but is biased for conduction during the time that switch S14 is cut off. Ring counter circuit 190 is then effective to operate through its successive steps from step 21. Upon reaching step No. 7 or 26′, switch S7 is rendered conductive which causes capacitor 346 included in OR circuit 230 to be discharged through resistor 300 in the cathode C circuit of switch S7 and resistor 347 in OR gate 230. When ring counter circuit 190 operates from its step 26′ as described supra, switch S7 is cut off which causes capacitor 346 to be rapidly charged causing a negative-going pulse to be coupled through diode 328 to the anode gate AG of switch S14 and phase B permissive circuit 197 causing switch S14 to turn on. In this connection, ring counter circuit 190 operates in its step 26′ wherein switch S7 is conductive until the phase B split signal is coupled to AND gate 280 whereupon ring counter circuit 190 is advanced to its next step 27′ wherein switch S8 is rendered conductive.

Upon occurrence of the phase C offset signal, it is coupled over wire 275 to the cathode C of switch S15 in phase C permissive circuit 198 through diode 349 and capacitor 332 to cut off switch S15. However, if there is no phase C vehicle call storage or pedestrian call storage, switch S15 is rendered conductive upon operation of ring counter circuit 190 in its step 27′ wherein switch S8 is rendered conductive. More specifically, a P-N-P type transistor Q7 in AND gate 271 is biased for conduction when either of the phase C memory flip-flops 81 and 84 is operated to its abnormal condition. In such abnormal condition, the flip-flop supplies a negative-going signal to the base of transistor Q7 through a resistor 350. Upon conduction of switch S8 in ring counter circuit 190, transistor Q7 conducts to cause capacitor 352 in OR circuit 242 to discharge through transistor Q7 and resistor 295 in the cathode circuit of switch S8 as well as resistor 353 in OR gate 242. When ring counter circuit 190 transfers from its step 27′ to its step 28′ in the manner described supra, capacitor 352 is rapidly charged which causes a negative-going pulse to be applied through diode 329 to the anode gate AG of switch S15 in phase C permissive circuit 198 causing switch S15 to turn on. Ring counter circuit 190 then returns to its step 21 according to the operation of check circuit 247 and the starting circuit described supra.

Where a vehicle call or pedestrian call does occur for phase C, however, transistor Q7 in AND gate 271 is biased to an OFF condition which permits switch S15 in phase C permissive circuit 198 to remain turned off. A transistor Q8 in the anode A circuit of switch S10 corresponding to step 25" of ring counter circuit 190 is then biased for conduction in that ground is applied through resistor 324 in the cathode circuit of switch S15 through resistor 354 to the base circuit of transistor Q8. Ring counter circuit 190 then operates through its phase C steps in the manner described supra in that AND gate 193 shown in FIG. 6C receives its three inputs concurrently for advancing ring counter circuit 190 to its step 25" from its step 28'.

Switch S15 in phase C permissive circuit 198 is again turned on upon operation of ring counter circuit 190 in its step 26" which corresponds to the operation of switch S11 shown in FIG. 8C. In particular, switch S11 when rendered conductive causes capacitor 356 in OR gate 242 to discharge through resistor 298 in the cathode C circuit of switch S11 and resistor 353 in OR gate 242. Upon transfer of operation from step 26" to step 27", capacitor 356 is again charged which causes a negative-going pulse to be coupled to the anode gate AG of switch S15 through diode 329 causing switch S15 to turn on. In this connection, the application of the phase C split signal to AND gate 281 while ring counter circuit is operating in step 26" causes such transfer of operation to step 27". This operation occurs, however, only when sufficient closely-spaced vehicles are detected in phase C for each of which a vehicle extension time period is measured by timer 122 as described above.

Should a vehicle call or pedestrian call occur only for phase C, the steps of ring counter circuit 190 assigned to phase A and phase C are operated responsive to the offset and split signals received according to the number of, for example, vehicle calls. More specifically, the phase B offset signal when applied causes phase B permissive circuit 197 to turn off in the manner described supra. However, upon occurrence of the phase C offset signal, AND gate 276 becomes effective through OR gate 230 to turn on phase B permissive circuit 197. More specifically, with ring counter circuit 190 operating in its step 21, the corresponding switch S2 is conducting which applies a positive-going output to AND gate 276 and more specifically to diode 361. Such positive-going output back-biases diode 361. Upon application of the phase C offset signal, diode 362 in AND gate 276 is also back-biased in that such signal is coupled to ground through resistor 363. When diodes 361 and 362 are concurrently back-biased, (+) energy is coupled through a resistor 364 to the base circuit of transistor Q9 in OR gate 230. Transistor Q9 being a N-P-N type transistor is biased into conduction during the time that such (+) energy is applied to its base circuit with such conduction circuit including resistors 366 and 367. Ground is coupled through transistor Q9 and through a capacitor 370 to anode gate AG of switch S14 through its diode 328 to cause phase B permissive circuit 197 to turn on. Transistor Q6 in the anode A circuit of switch S6 remains cut off so that ring counter circuit 190 does not operate in the steps assigned to phase B.

Phase C permissive circuit 198 is turned off in the manner described upon occurrence of the phase C offset signal to bias transistor Q8 for conduction. Upon operation, switch S11 in step 26" of ring counter circuit 190 for phase C is operated until the phase C split is applied where a plurality of vehicles are detected for phase C. If phase C receives only a limited number of vehicle calls, however, the last such vehicle call causes timer 122 to provide its output for advancing ring counter circuit 190 through the clearance steps to its dwell step 21.

In order that phase C permissive circuit 198 be turned on where no vehicle calls or pedestrian calls occur on either of phase B or phase C, AND gate 277 is effective upon application of the phase B split signal to turn on phase C permissive circuit 198 through OR gate 242. More specifically, the positive-going signal from switch S2 when conducting is coupled to diode 370 of AND gate 277 for back-biasing such diode. The presence of the phase B split signal back-biases diode 371 when it is applied to ground through a resistor 372. (+) energy is then coupled through resistor 373 of AND gate 277 and to the base circuit of an N-P-N transistor Q10 included with OR gate 242. Transistor Q10 then conducts through the circuit including resistors 375 and 376 which causes capacitor 377 in the collector circuit of transistor Q10 to charge through resistor 353. As a result of the charging of capacitor 377, a negative-going pulse is applied through diode 329 to the anode gate AG of switch S15 causing it to turn on.

FIG. 11 illustrates a modification of the switch arrangement which may be employed with each of the embodiments shown respectively in FIGS. 2 and 6. Referring now to FIG. 11, an office location is illustrated whereat a special offset relay is provided which may be controlled in a manner well known in the art to provide special operation of traffic signal controllers which are coupled through a communication circuit to that office location. At each controller location, a light traffic offset relay LTOR is appropriately controlled to its picked up condition when the special offset is in effect, but is dropped away when the special offset is not in effect as characterized by the operation of the special offset relay at the office location. A contact 380 of relay LTOR couples energy from one of two input terminals through a selected position of a switch 381 to an output terminal. The input terminal may be coupled, for example, to the output of one of the steps of ring counter circuit 190, while the output terminal of switch 381 may be coupled, for example, to timing circuit 15.

The three positions of switch 31 are designated AP or the allow position, HP or the hold position and EP or the exclude position. In its position AP, switch 381 appropriately couples circuits when relay LTOR is picked up as a result of, for example, medium or heavy traffic conditions. In position HP of switch 381, the traffic signal controller is held in a given operating condition wherein a green aspect is displayed for a given phase until switch 381 is moved to a different one of its positions. In position EP of switch 381, the traffic signal controller is responsive to the normally received offset and split signals in the manner described supra. It is to be understood that the switch 381 as well as the relay LTOR for each of the controller locations may be electronic in form such that the operation thereof can be automatically performed from a remote office location.

Having described two embodiments of a highway traffic signal controller of the three-phase semi-actuated type as specific embodiments of the present invention, it should be understood that these embodiments illustrated are considered as being merely typical and that various modifications and alterations may be made to the specific forms shown without departing from the spirit or scope of the invention.

What I claim is:

1. A multi-phase controller for traffic signals having a plurality of signal lamps which are illuminated in different combinations on successive intervals of each signal cycle and comprising in combination, a counter having a predetermined number of steps and including means for operating said counter from one step to the next in sequence, selector means operable between first and second conditions, said selector means in the first of its conditions operatively connecting said counter on any one step of a successive plurality of its steps with a respective first plurality of said signal lamps and in a second of its conditions operatively connecting said counter on said one step with a respective second plurality of signal lamps, and means for at times operating said selector means between its said first and second conditions but only when none of said successive plurality of steps of said counter is being operated.

2. The controller of claim 1 which further includes traffic responsive means for detecting vehicles on at least one of the approaches to an intersection where traffic movements are governed by the controller, and means controlled by said traffic responsive means for operating said selector means.

3. The controller of claim 1 in which said successive plurality of steps of said counter comprises less than the total number of steps of said counter.

4. A controller for the traffic signals at an intersection of more than two mutually interfering traffic rights-of-way comprising, an electronic counter counting a predetermined number of steps, signal control means operatively connecting said counter to the signal lamps of said traffic signals for selectively energizing a predetermined plurality of said lamps on each successive step of said counter, means for operating said counter from one step to the next and including a timing means controlled by said counter on each individual step thereof for normally measuring the time that said counter remains on any of its steps, a selected plurality of said steps timing the signal intervals of a particular phase of a signal cycle in which phase PROCEED and CLEARANCE signal indications are sequentially displayed to traffic on one of said conflicting rights-of-way, means responsive to traffic approaching said intersection on said one right-of-way for operating said counter through each of said selected plurality of steps thereof substantially instantaneously in the absence of any traffic detected on the corresponding right-of-way, said counter when operated substantially instantaneously from one step to the next energizing the plurality of signal lamps corresponding to that step for so short a period of time that no signal indication is displayed by said signal lamp.

5. In a controller for traffic signals governing traffic at an intersection of at least three mutually conflicting rights-of-way the combination comprising, an electronic counter operable in a predetermined direction through a succession of steps, signal control means operatively connecting said counter with the lamps of said traffic signals for controlling said signals to display PROCEED and CLEARANCE indications in turn to traffic on each of said rights-of-way as said counter is operated through all its steps, traffic responsive means for at least all but one of said conflicting rights-of-way, circuit means operatively connecting each said traffic responsive means with said counter for operating said counter through said succession of steps one step at a time, said circuit means operating said counter in response to the detection of traffic by any said traffic responsive means to the first of a plurality of successive steps on which PROCEED and CLEARANCE signal indications are displayed to traffic on the right-of-way associated with such traffic repsonsive means and thereafter operating said counter at timed intervals throughout successive steps of said first plurality, said circuit means when operating said counter through any other plurality of said successive steps associated with a right-of-way for which no traffic has been detected by the corresponding traffic responsive means controlling said counter to operate substantially instantaneously from one step of such other plurality to the next, said counter being operated so rapidly from one step to the next of said other plurality that the signal lamps normally energized on said steps do not provide any signal indications.

6. The traffic signal controller of claim 5 in which said counter is a ring counter.

7. The combination of claim 5 in which said controller is of the semi-actuated type in which said circuit means controls said counter to dwell normally on the particular step thereof in which a PROCEED indication is controlled to be displayed to traffic on the corresponding right-of-way which is not provided with a traffic responsive means, said circuit means operating said counter through a complete cycle of operation in response to the detection of traffic by any said traffic responsive means.

8. The controller of claim 5 in which timing means controlled by at least one said traffic responsive means controls the length of time that said counter remains on the particular step in which traffic on the particular right-of-way associated with said traffic responsive means receives a PROCEED indication.

9. A controller for the traffic signals at an intersection of mutually conflicting rights-of-way comprising in combination, an electronic counter, means for normally operating said counter at individually timed intervals from one step to the next in sequence, circuit means operatively connecting said counter to the lamps of said traffic signal for energizing a respective combination of said signal lamps on each step of said counter, traffic-responsive means, and means controlled by said traffic-responsive means for at times operating said counter through at least one selected step thereof at such a high rate of speed that the combination of signal lamps which is energized by said circuit means on said step is energized for so short a period of time that no visual indication is displayed thereby.

References Cited by the Examiner
UNITED STATES PATENTS

| | | | |
|---|---|---|---|
| 3,056,946 | 10/1962 | Brockett | 340—35 |
| 3,208,038 | 9/1965 | Jeffers | 340—35 |

NEIL C. READ, *Primary Examiner.*

THOMAS B. HABECKER, *Examiner.*